United States Patent [19]

Tamai et al.

[11] Patent Number: 5,494,996
[45] Date of Patent: Feb. 27, 1996

[54] POLYIMIDE RESIN COMPOSITION

[75] Inventors: Shoji Tamai; Yuichi Okawa; Wataru Yamashita; Yoshihiro Sakata; Hideaki Oikawa, all of Kanagawa; Keizaburo Yamaguchi, Chiba; Tadashi Asanuma, Osaka; Akihiro Yamaguchi; Mitsunori Matsuo, both of Kanagawa, all of Japan

[73] Assignee: Mitsui Toatsu Chemicals Inc., Tokyo, Japan

[21] Appl. No.: 277,568

[22] Filed: Jul. 20, 1994

[30] Foreign Application Priority Data

| Jul. 28, 1993 | [JP] | Japan | 5-185907 |
| Jul. 29, 1993 | [JP] | Japan | 5-187794 |
| Sep. 1, 1993  | [JP] | Japan | 5-217153 |
| Oct. 21, 1993 | [JP] | Japan | 5-263427 |
| Nov. 11, 1993 | [JP] | Japan | 5-282228 |

[51] Int. Cl.$^6$ ............................ C08G 73/10
[52] U.S. Cl. .......... 528/353; 524/600; 524/606; 524/607
[58] Field of Search .................. 528/353; 524/600, 524/606, 607

[56] References Cited

U.S. PATENT DOCUMENTS

| 4,485,140 | 11/1984 | Gannett et al. | 428/260 |
| 4,734,482 | 3/1988  | Tamai et al.   | 528/185 |

FOREIGN PATENT DOCUMENTS

| 292243     | 11/1988 | European Pat. Off. |
| 61-143478  | 7/1986  | Japan . |
| 61-143477  | 7/1986  | Japan . |
| 62-50374   | 3/1987  | Japan . |
| 62-50375   | 3/1987  | Japan . |
| 62-86021   | 4/1987  | Japan . |
| 62-205124  | 9/1987  | Japan . |
| 62-235381  | 10/1987 | Japan . |
| 63-37123   | 2/1988  | Japan . |
| 63-128025  | 5/1988  | Japan . |
| WO86/04079 | 7/1986  | WIPO . |

OTHER PUBLICATIONS

Patent Abstracts of Japan, vol. 13, No. 221 (C–598) (3569); May 23, 1989.

*Primary Examiner*—Shelley A. Dodson
*Attorney, Agent, or Firm*—Burns, Doane, Swecker & Mathis

[57] ABSTRACT

A polyimide resin composition substantially comprising ① 99.9~50 parts by weight of polyimide having recurring structural units of the formula and ② 0.1~50 parts by weight of a polyimide which improved melt flowability and is prepared by using 1,3-bis(3-aminophenoxy)benzene or 6,6'-bis(3-aminophenoxy)-3,3,3',3'-tetramethyl-1,1'-spirobiindane as essential diamine component, or polyether pyridine having recurring structural units of the formula:

is disclosed. Further, a polyimide based resin composition comprising the polyimide resin composition or a polyimide copolymer obtained by using the above diamines and a fibrous reinforcement is disclosed. These compositions have remarkably good processability, excellent heat stability and repeated fatigue characteristics.

18 Claims, No Drawings

POLYIMIDE RESIN COMPOSITION

BACKGROUND OF THE INVENTION

1. Field of the Invention

The present invention relates to a melt-processable polyimide resin composition and more particularly relates to an aromatic polyimide resin composition which has outstanding melt-processability and is excellent in heat and chemical resistances and mechanical strength and is particularly superior in repeated fatigue characteristics.

2. Description of the Related Art

Conventionally, polyimide has been known to provide excellent mechanical strength and dimensional stability in addition to its high heat resistance and has exhibited outstanding in flame retardance and electrical insulation. Consequently, polyimide has been used in the field of electric and electronic appliances, space and aeronautic equipment and transport machinery and is expected in future for wide use in the field where heat resistance is required. Polyimide of various kinds which exhibit excellent characteristics has conventionally been developed. However, such polyimide has no distinct glass transition temperature though outstanding in heat resistance and thus must be processed by such means as sintering in order to use as a molding material. On the other hand, polyimide which has excellent processability is insufficient in heat and solvent resistances because of a low glass transition temperature and solubility in halogenated hydrocarbon solvents.

Consequently, characteristics and drawbacks have been simultaneously found in conventional polyimide.

With the extended application of polyimide to various fields of use, it has been strongly desired to develop polyimide which can satisfy various kinds of performance.

In particular, in the above industrial field, it has been desired to develop a polyimide having excellent dynamic repeated fatigue characteristics in addition to the above inherent excellent properties of polyimides as an industrial material instead of a metal, for mechanical parts, automobile parts, for example, parts for internal combustion engine such as impeller of centrifugal compressor or, turbo-charger, parts for a silencer and exhaust system such as manifold, and valve-guides, valve-system, pistons, skirts, oil pans and the like.

In order to meet such demands, the present inventors have previously found melt-processable polyimide which is excellent in mechanical and electrical properties and also exhibits outstanding heat and chemical resistances, and has recurring structural units of the formula (1):

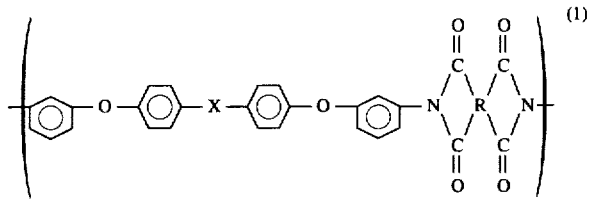

wherein X is a radical selected from the group consisting of a direct bond, isopropylidene, hexafluoroisopropylidene, carbonyl, thio and sulfonyl, and R is a tetravalent radical having 2–27 carbon atoms and being selected from the group consisting of an aliphatic radical, alicyclic radical, monoaromatic radical, condensed polyaromatic radical and noncondensed aromatic radical connected to each other with a direct bond or a bridge member. (Japanese Laid-Open Patent Sho 61-143478, 62-86021, 62-205124, 62-235381 and 63-128025).

The polyimide is a melt-processable and heat-resistant resin having many excellent fundamental properties which are specific for polyimide. However, the polyimide is somewhat inferior in processability although heat resistance and other properties are much superior to engineering plastics such as polyethylene terephthalate, polyether sulfone and polyphenylene sulfide.

Another melt-processable polyimide having recurring structural units of the formula (5):

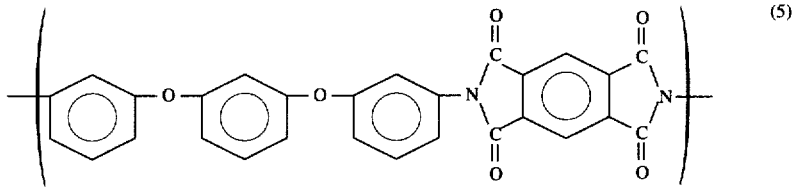

and having a glass-transition temperature of about 200° C. has been already disclosed in U.S. Pat. No. 4,485,140 and Japanese Laid-Open Patent SHO 61-143477.

A further polyimide having recurring structural units of the formula (6):

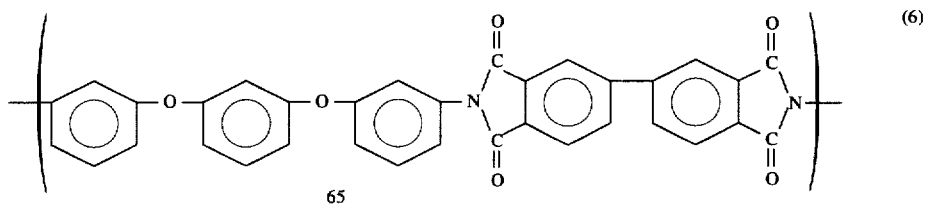

and having high heat-resistance and very excellent melt flowability has been disclosed by the present inventors in Japanese Laid-Open Patent SHO 61-143477.

Still another polyimide having recurring structural units of the formula (7):

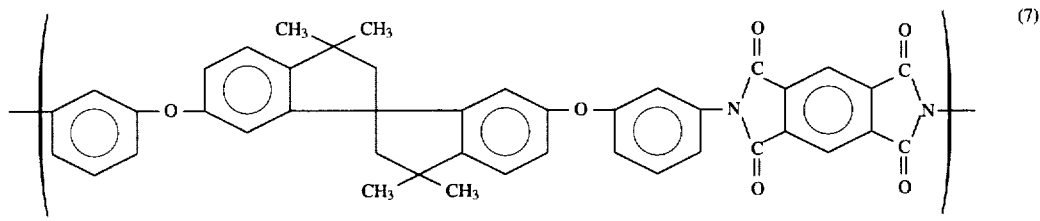

and having extremely excellent melt-flowability has been disclosed by the present inventors in Japanese Laid-Open Patent SHO 62-50375.

Further, polyether pyridine having recurring structural units of the formula (4)

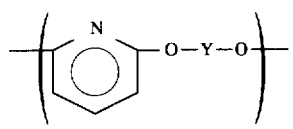

wherein Y is a divalent radical represented by

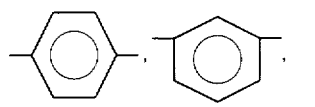

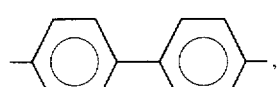

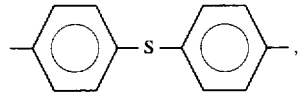

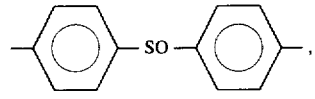

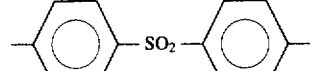

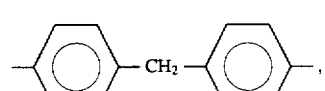

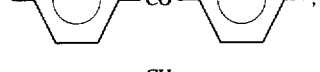

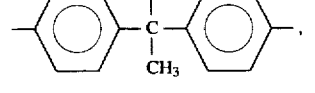

-continued

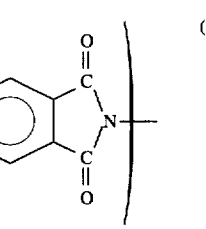

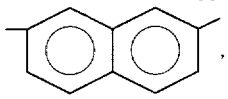

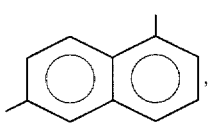

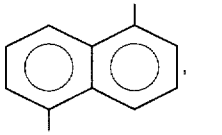

or

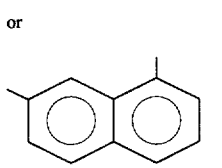

and having high heat-resistance and extremely outstanding melt-flowability has also been found by the present inventors (Japanese Laid-Open Patent SHO 63-37123).

Some of polyether pyridines have a high melting point of 250° C. or above, initiate melt-flow in the neighborhood of 270° C., have a very low viscosity in the molten state and are thus excellent in melt-processability.

Although polyimide and polyether pyridine have good melt-processability, other characteristics are still unsatisfactory and cannot meet the demand for polyimide which is excellent in the above various performances and has good processability.

Further, a polyimide instead of a metal, which has excellent dynamic repeated fatigue characteristic has not been disclosed.

SUMMARY OF THE INVENTION

One object of the invention is to provide a polyimide resin composition having very excellent melt-processability in terms of melting temperature and flowability without giving adverse effect on the essential characteristics of polyimide. More specifically, the object is to provide a polyimide resin composition which has much improved processability while holding various excellent properties of polyimide having recurring structural units of the above formula (1).

Another object of the invention is to provide a polyimide resin composition which affords formed articles having outstanding repeated fatigue characteristics.

As a result of an intensive investigation in order to accomplish the above objects, the present inventors have found that a polyimide resin composition which comprises polyimide having recurring structural units of the above formula (1) and a specific amount of melt-flowability enhancing polyimide having recurring structural units of the above formula (5), (6) or (3), which is selected from various kinds of polyimide, or polyether pyridine having recurring structural units of the above formula (4) can remarkably improve the melt-processability of polyimide of the formula (1) without impairing the essential characteristics of polyimide, and can also provide excellent fatigue characteristics of formed articles. Thus the present invention has been completed.

That is, one aspect of the invention is a polyimide resin composition substantially comprising 99.9~50 parts by weight of polyimide comprising a requisite structural unit consisting of one or more recurring structural units of the formula (1):

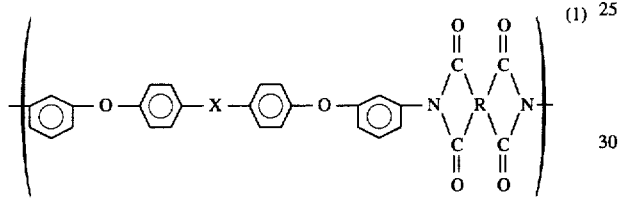

wherein X is a radical selected from the group consisting of a direct bond, isopropylidene, hexafluoroisopropylidene, carbonyl, thio and sulfonyl, and R is a tetravalent radical having 2~27 carbon atoms and being selected from the group consisting of an aliphatic radical, alicyclic radical, monoaromatic radical, condensed polyaromatic radical and noncondensed aromatic radical connected to each other with a direct bond or a bridge member, and 0.1~50 parts by weight of polyimide comprising a requisite structural unit consisting of one or more recurring structural units of the formula (2):

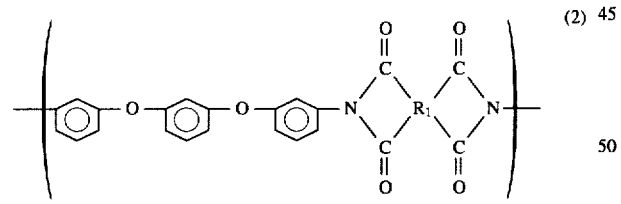

wherein $R_1$ is a tetravalent radical represented by

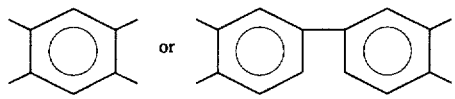

or polyimide comprising a requisite structural unit consisting of one or more recurring structural units of the formula (3):

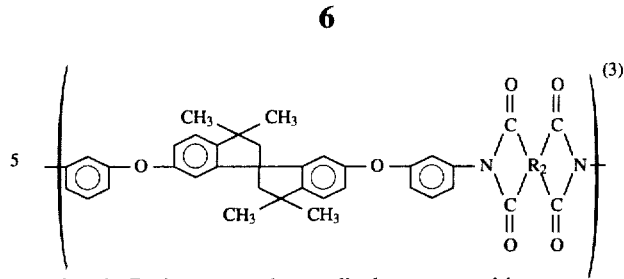

wherein $R_2$ is a tetravalent radical represented by

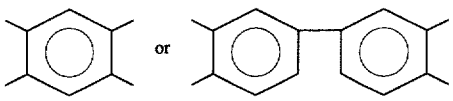

and/or polyether pyridine comprising a requisite structural unit consisting of one or more recurring structural units of the formula (4):

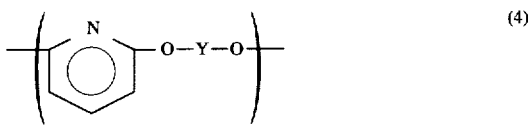

wherein Y is a divalent radical represented by

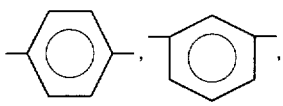

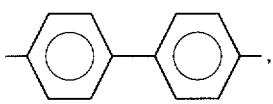

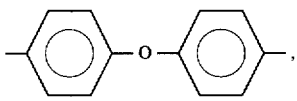

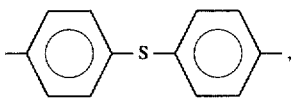

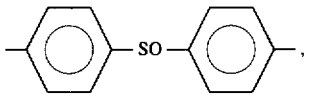

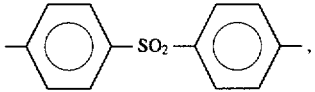

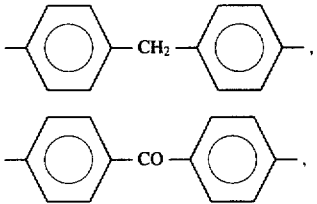

-continued

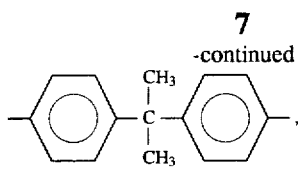

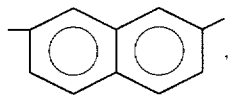,

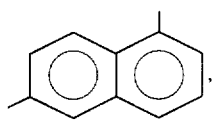,

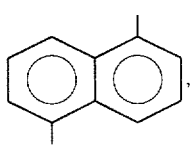,

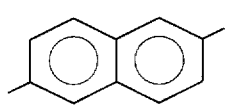, or

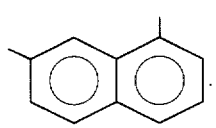.

To be more precise, a further aspect of the invention is a polyimide resin composition substantially comprising 99.9–50 parts by weight of polyimide comprising a requisite structural unit consisting of one or more recurring structural units of the formula (1):

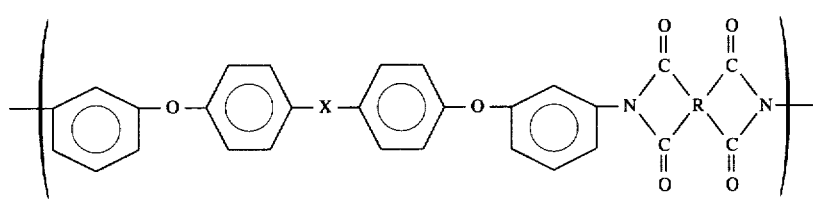

wherein X and R are the same as above, and 0.1–50 parts by weight of polyimide having recurring structural units of the formula (5):

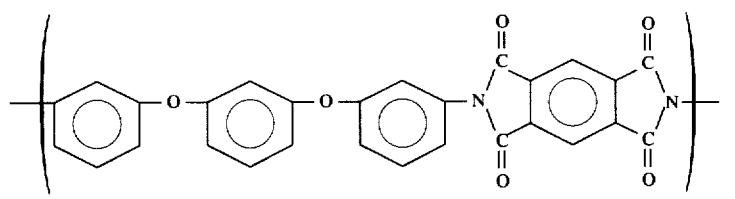

Another aspect of the invention is a polyimide resin composition substantially comprising 99.9–50 parts by weight of polyimide comprising a requisite structural unit consisting of one or more recurring structural units of the formula (1) and 0.1–50 parts by weight of polyimide having recurring structural units of the formula (6):

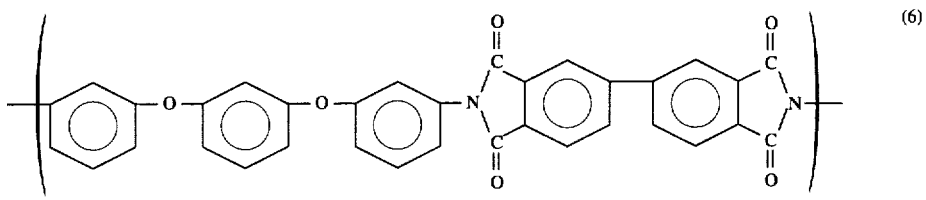

(6)

A further aspect of the invention is a polyimide resin composition substantially comprising 99.9~50 parts by weight of polyimide comprising a requisite structural unit consisting of one or more recurring structural units of the formula (1) and 0.1~50 parts by weight of polyimide having recurring structural units of the formula (7):

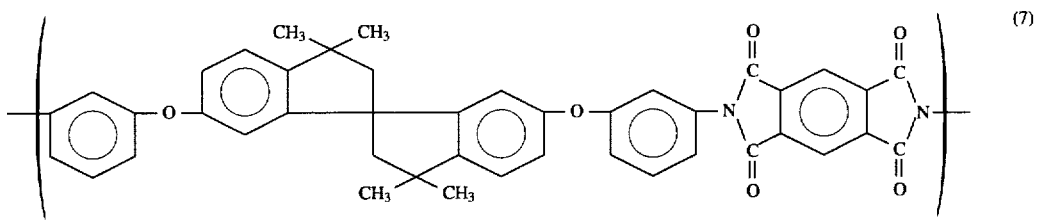

(7)

A further another aspect of the invention is a polyimide resin composition substantially comprising 99.9~50 parts by weight of polyimide comprising a requisite structural unit consisting of one or more recurring structural units of the formula (1) and 0.1~50 parts by weight of polyimide having recurring structural units of the formula (8):

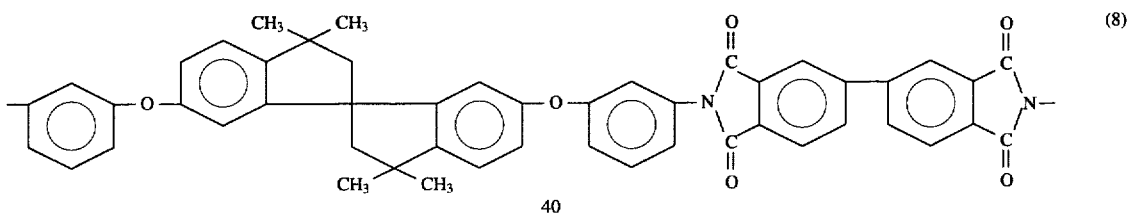

(8)

Still another aspect of the invention is a polyimide resin composition substantially comprising 99.9~50 parts by weight of polyimide comprising a requisite structural unit consisting of one or more recurring structural units of the formula (1) and 0.1~50 parts by weight of polyether pyridine comprising a requisite structural unit consisting of one or more recurring structural units of the formula (4):

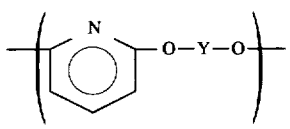

(4)

wherein Y is the same as above.

A still further aspect of the invention is a polyimide resin composition wherein, in each of the above compositions, polyimide comprising a requisite structural unit consisting of one or more recurring structural units of the formula (1), polyimide having recurring structural units of the formula (2), (3), (5), (6), (7) or (8) and polyimide copolymer having one or more recurring structural units of these formulas comprise an end-capped polyimide polymer obtained by reacting diamine compound and tetracarboxylic dianhydride in the presence of aromatic dicarboxylic anhydride of the formula (9):

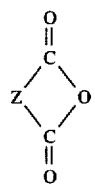

(9)

wherein Z is a divalent radical having 6~15 carbon atoms and being selected from the group consisting of a monoaromatic radical, condensed polyaromatic radical and noncondensed aromatic radical connected to each other with a direct bond or a bridge member, and/or aromatic monoamine represented by the formula (10):

V—NH$_2$ (10)

wherein V is a monovalent radical having 6~15 carbon atoms and being selected from the group consisting of a monoaromatic radical, condensed polyaromatic radical and noncondensed aromatic radical connected to each other with a direct bond or a bridge member.

Additionally, a polyimide copolymer also is included as the polyimide used in the present invention. In the polyimide copolymer, polyimide having the structural recurring units of the formulas (1):

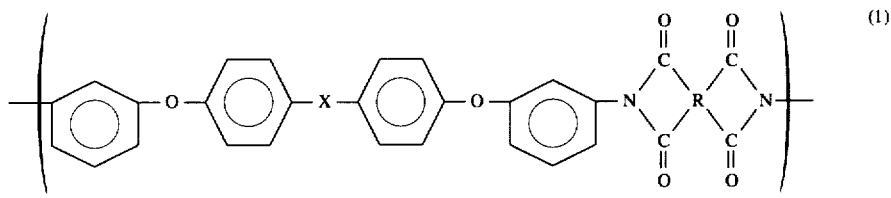

(wherein X and R are the same as above) and the structural recurring units of the formulas (2):

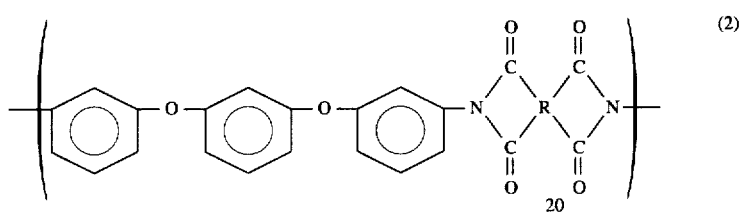

(wherein $R_1$ is the same as above) is preferable, more preferably, is the polyimide copolymer comprising 0.5 to 0.95 mole of the recurring structural unit of the formula (1) and 0.5 to 0.05 mole of the recurring structural unit of the formula (2), and is the polyimide copolymer wherein the recurring structural units of the formula (1) is represented by the formula (1-a):

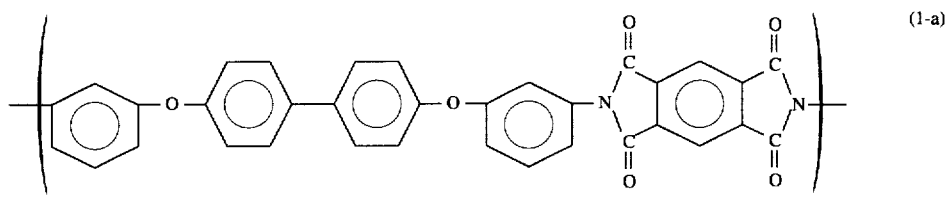

and/or the formula (1-b)

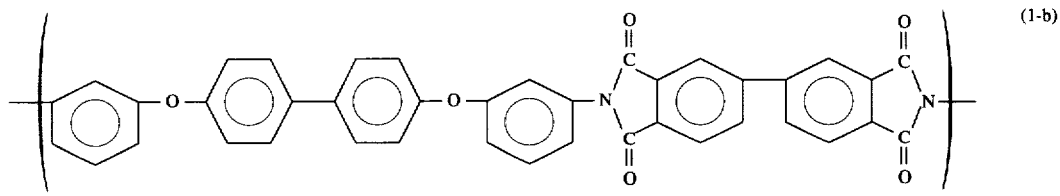

and the recurring structural units of the formula (2) is represented by the formula (5)

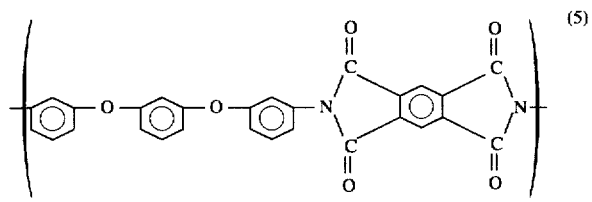

and/or the formula (6)

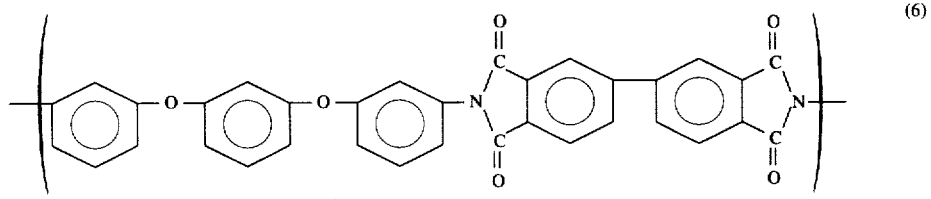

and most preferable polyimide copolymer is the polyimide copolymer having the recurring structural units represented by the formula (1-a) and the recurring structural units represented by the formula (5).

These polyimide copolymers also include a capped polyimide which is terminated at the end of the polymer chain with an aromatic ring which is unsubstituted or substituted with a radical having no reactivity with amine or dicarboxylic anhydride.

These polyimide compositions of the invention have improved processability and excellent dynamic repeated fatigue characteristics without giving adverse effect on the essential characteristics of polyimide having recurring structural units of the formula(1).

DETAILED DESCRIPTION OF THE INVENTION

Polyimides used in the present invention are; ① a polyimide comprising a requisite structural unit consisting of one or more recurring structural units of the formula (1):

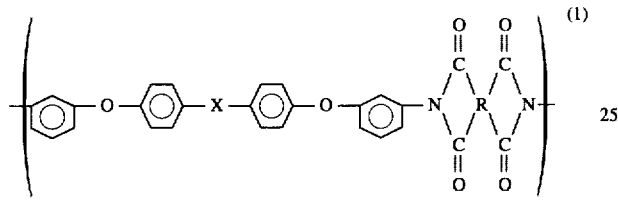

wherein X and R are the same as above, ② a polyimide having a requisite structural unit consisting of one or more recurring structural units of the formula (2):

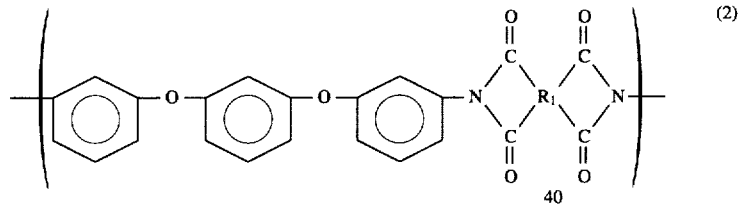

wherein $R_1$ is the same as above, more specifically a polyimide having recurring structural units represented by the formula (5):

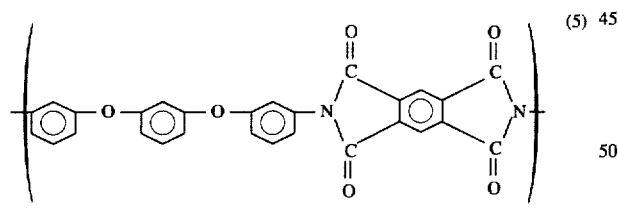

and/or the formula (6):

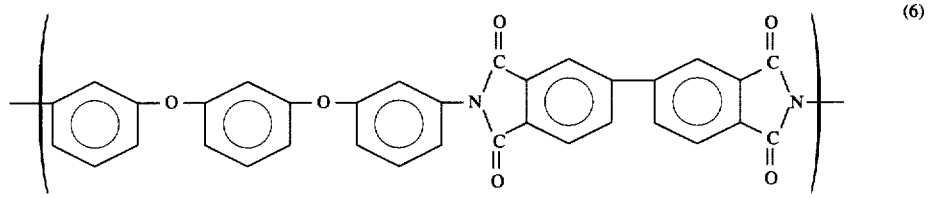

or ③ a polyimide having a requisite structural unit consisting of one or more recurring structural units of the formula (3):

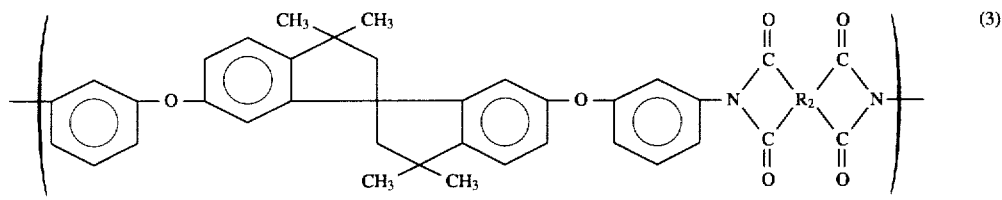

wherein $R_2$ is the same as above, more specifically a polyimide having recurring structural recurring units represented by the formula (7):

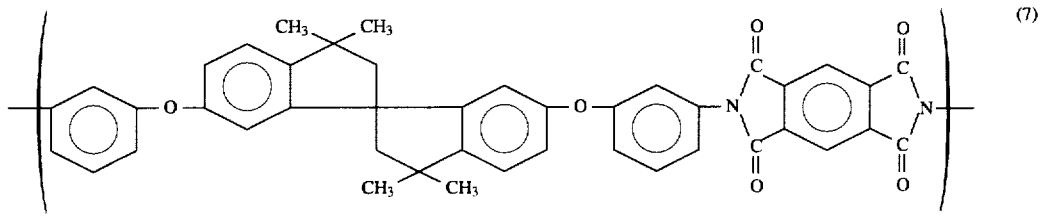

and/or the formula (8):

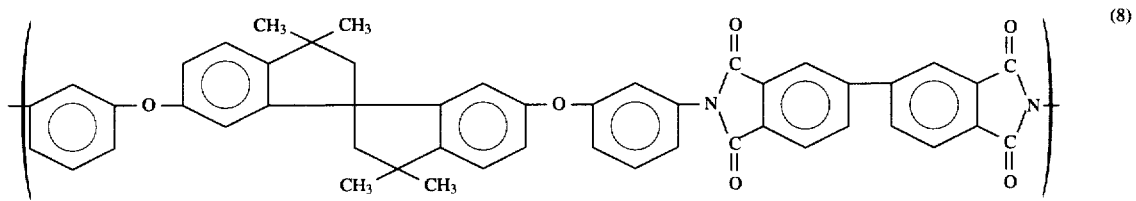

These polyimides represented by the formulas (2) and (3), that the polyimide having recurring structural unit of the formula (5), (6), (7) or (8), can be used singly or as a mixture, or may be a polyimide copolymer containing two or more of above recurring structural units.

Preferred polyimide copolymer in the present invention is the polyimide copolymer having the recurring structural unit represented by the formula(1) and the recurring structural unit represented by the formula (2).

The polyimide copolymer preferably contains 0.5 to 0.95 mole of the recurring structural units of the formula (1) and 0.5 to 0.05 mole of the recurring structural units of the formula (2) per mole of the polyimide copolymer.

The polyimide copolymer which the recurring structural unit represented by the formula (1) is recurring structural unit of the formula (1-a):

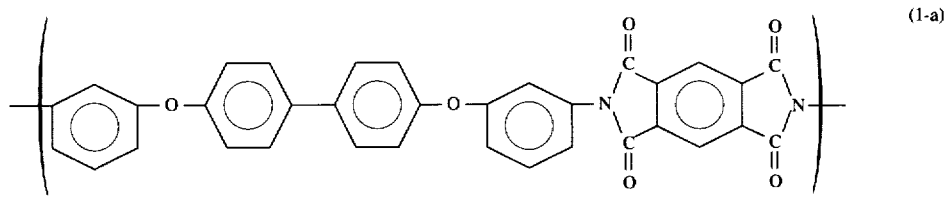

and/or the formula (1-b):

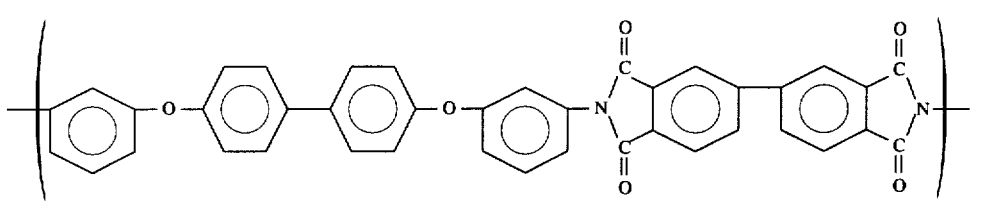 (1-b)

and the recurring structural unit represented by the formula (2) is recurring structural unit of the formula (5)

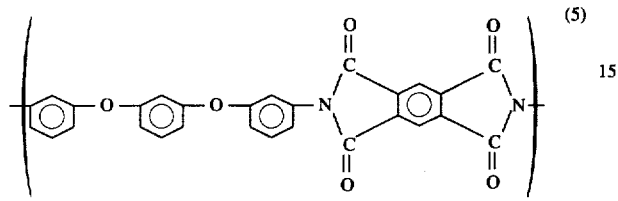 (5)

and/or the formula (6)

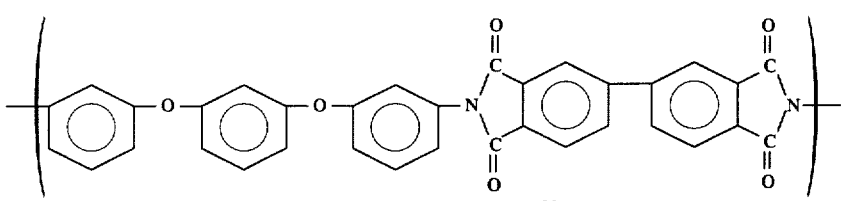 (6)

is more preferable. The polyimide copolymer having recurring structural unit of the formula (1-a) and the formula (5) is most preferable.

The polyimide copolymer also includes a capped polyimide copolymer which is terminated at the end of the polymer chain with an aromatic dicarboxylic dianhydride of the formula (9) and/or an aromatic monoamine of the formula (10).

Polyimide having recurring structural units of the formula (1) can be prepared from the below-described diamine and tetracarboxylic dianhydride by the known process disclosed in Japanese Laid-Open Patent SHO 61-143478.

Diamine used for the preparation of polyimide having recurring structural units of the formula (1) is represented by the formula (11)

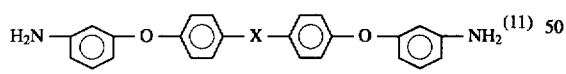 (11)

Wherein X is a divalent radical selected from the group consisting of a direct bond, isopropylidene, hexafluoroisopropylidene, carbonyl, thio and sulfonyl.

Exemplary diamines which can be used include, 2,2-bis[4-(3-aminophenoxy)phenyl]propane, 2,2-bis[4-(3-aminophenoxy)phenyl]-1,1,1,3,3,3-hexafluoropropane, 4,4'-bis(3-aminophenoxy)biphenyl, bis[4-(3-aminophenoxy)phenyl]ketone, bis[4-(3-aminophenoxy)phenyl]sulfide and bis[4-(3-aminophenoxy)phenyl]sulfone. These diamines can be used singly or as a mixture.

Tetracarboxylic dianhydride which can be used is represented by the formula (12):

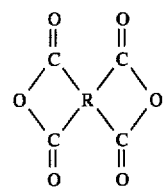 (12)

wherein R is a tetravalent radical having 2–27 carbon atoms and being selected from the group consisting of an alkyl radical, alicyclic radical, monoaromatic radical, condensed polyaromatic radical and noncondensed aromatic radical connected to each other with a direct bond or a bridge member.

In the formula (12) which illustrates tetracarboxylic dianhydride, R is more specifically:

(a) an aliphatic radical having 4–9 carbon atoms, (b) an alicyclic radical having 4–10 carbon atoms, (c) a monoaromatic radical represented by the formula:

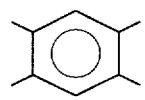

(d) a condensed polyaromatic radical represented by the formula:

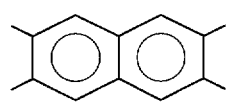

or

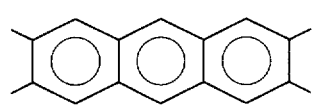

(e) a noncondensed aromatic radical connected to each other with a direct bond or a bridge member and represented by the formula:

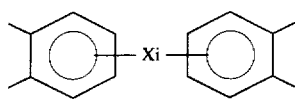

wherein $X_i$ is a direct bond, —O—, —S—, —SO$_2$—, —CH$_2$—,

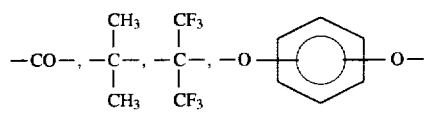

or

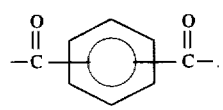

Exemplary tetracarboxylic dianhydrides which can be practically used include ethylenetetracarboxylic dianhydride, butanetetracarboxylic dianhydride, cyclopentanetetracarboxylic dianhydride, pyromellitic dianhydride, 3,3',4,4'-benzophenonetetracarboxylic dianhydride, 2,2',3,3'-benzophenonetetracarboxylic dianhydride, 3,3',4,4'-biphenyltetracarboxylic dianhydride, 2,2',3,3'-biphenyltetracarboxylic dianhydride, 2,2-bis(3,4-dicarboxyphenyl)propane dianhydride, 2,2-bis(2,3-dicarboxyphenyl)propane dianhydride, bis(2,3-dicarboxyphenyl)ether dianhydride, bis(3,4-dicarboxyphenyl)ether dianhydride, bis(2,3-dicarboxyphenyl)sulfone dianhydride, bis(3,4-dicarboxyphenyl)sulfone dianhydride, bis(2,3-dicarboxyphenyl)methane dianhydride, bis(3,4-dicarboxyphenyl)methane dianhydride, 1,1-bis(2,3-dicarboxyphenyl)ethane dianhydride, 1,1-bis(3,4-dicarboxyphenyl)ethane dianhydride, 1,2-bis(2,3-dicarboxyphenyl)ethane dianhydride, 1,2-bis(3,4-dicarboxyphenyl)ethane dianhydride, 1,3-bis(2,3-dicarboxyphenoxy)benzene dianhydride, 1,3-bis(3,4-dicarboxyphenoxy)benzene dianhydride, 1,4-bis(2,3-dicarboxyphenoxy)benzene dianhydride, 1,4-bis(3,4-dicarboxyphenoxy)benzene dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, and 1,2,7,8-phenanthrenetetracarboxylic dianhydride.

These tetracarboxylic dianhydrides can be used singly or as a mixture.

Polyimide of the formula (5) or (6) can be prepared by reacting diamine, 1,3-bis(3-aminophenoxy)benzene, represented by the formula (13):

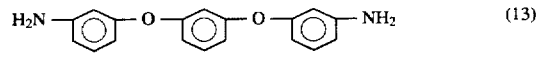 (13)

with tetracarboxylic dianhydride, pyromellitic dianhydride of the formula (14):

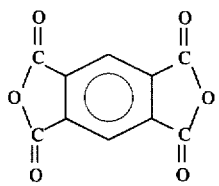 (14)

or 3,3'4,4'-biphenyltetracarboxylic dianhydride of the formula (15):

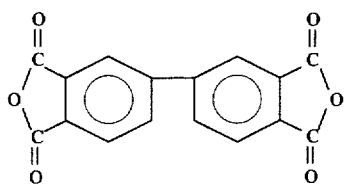 (15)

Polyimide of the formula (7) or (8) can be prepared by reacting diamine, 6,6'-bis(3-aminophenoxy)-3,3,3',3'-tetramethyl-1,1'-spirobiindane, represented by the formula (16):

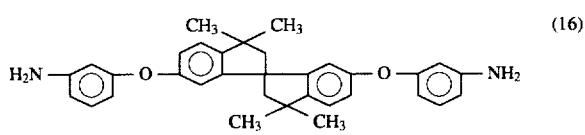 (16)

with tetracarboxylic dianhydride, pyromellitic dianhydride represented by the formula (14):

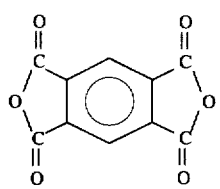 (14)

or 3,3'4,4'-biphenyltetracarboxylic dianhydride represented by the formula (15):

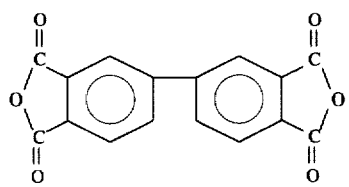 (15)

Further, the polyimide copolymer can be prepared by using two or more diamine compounds or two or more tetracarboxylic dianhydrides as raw materials.

That is, the polyimide copolymer having recurring structural units of the formula (1) and recurring structural units of the formula (2) is obtained by reacting diamine represented by the formula (11):

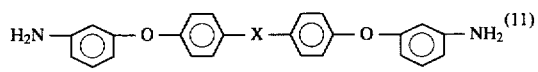 (11)

wherein X is the same as above and diamine represented by the formula (13):

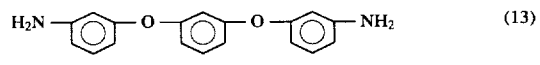 (13)

as diamine component, with tetracarboxylic dianhydride represented by the formula (12)

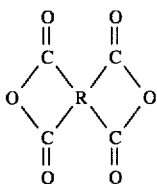

wherein R is the same as above.

Prefered polyimide copolymer having the above recurring structural unit of the formula (1-a) and/or the formula (1-b) and the above recurring structural unit of the formula (5) and/or the formula (6) can be obtained by reacting diamine represented by the formula (11-a)

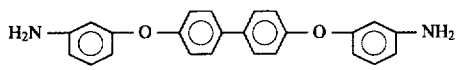

and diamine represented by the formula (13)

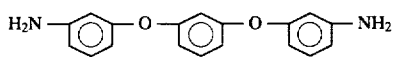

as diamine component, with pyromellitic dianhydride represent by the formula (14)

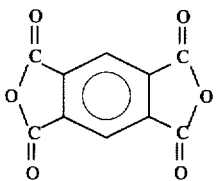

and/or 3,3',4,4'-biphenyltetracarboxylic dianhydride represented by the formula(15)

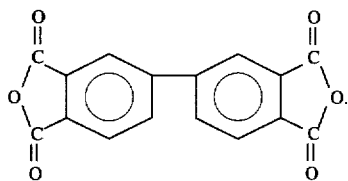

Each polyimide or polyimide copolymer for use in the invention is prepared by using above diamine as a raw material. However, other diamines can also be used in combination with the above diamine in the range of giving no adverse effect on the good properties of polyimide.

Other diamines which can be used in combination include, for example, m-phenylenediamine, o-phenylenediamine, p-phenylenediamine, m-aminobenzylamine, o-aminobenzylamine, 3-chloro-1,2-phenylenediamine, 4-chloro-1,2-phenylenediamine, 2,3-diaminotoluene, 2,4-diaminotoluene, 2,5-diaminotoluene, 2,6-diaminotoluene, 3,4-diaminotoluene, 3,5-diaminotoluene, 2-methoxy-1,4-phenylenediamine, 4-methoxy-1,2-phenylenediamine, 4-methoxy-1,3-phenylenediamine, benzidine, 3,3'-dichlorobenzidine, 3,3'-dimethylbenzidine, 3,3-dimethoxybenzidine, 3,3'-diaminodiphenyl ether, 3,4'-diaminodiphenyl ether, 4,4'-diaminodiphenyl ether, 3,3'-diaminodiphenyl sulfide, 3,4'-diaminodiphenyl sulfide, 4,4'-diaminodiphenyl sulfide, 3,3'-diaminodiphenyl sulfoxide, 3,4'-diaminodiphenyl sulfoxide, 4,4'-diaminodiphenyl sulfoxide, 3,3'-diaminodiphenyl sulfone, 3,4'-diaminodiphenyl sulfone, 4,4'-diaminodiphenyl sulfone, 3,3'-diaminobenzophenone, 3,4'-diaminobenzophenone, 4,4'-diaminobenzophenone, 3,3'-diaminodiphenylmethane, 3,4'-diaminodiphenylmethane, 4,4'-diaminodiphenylmethane, bis[4-(4-aminophenoxy)phenyl]methane, 1,1-bis[4-(4-aminophenoxy)phenyl]ethane, 1,2-bis[4-(4-aminophenoxy)phenyl]ethane, 1,1-bis[4-(4-aminophenoxy)phenyl]propane, 1,2-bis[4-(4-aminophenoxy)phenyl]propane, 1,3-bis[4-(4-aminophenoxy)phenyl]propane, 2,2-bis[4-(4-aminophenoxy)phenyl]propane, 1,1-bis[4-(4-aminophenoxy)phenyl]butane, 1,2-bis[4-(4-aminophenoxy)phenyl]butane, 1,3-bis[4-(4-aminophenoxy)phenyl]butane, 1,4-bis[4-(4-aminophenoxy)phenyl]butane, 2,2-bis[4-(4-aminophenoxy)phenyl]butane, 2,3-bis[4-(4-aminophenoxy)phenyl]butane, 2-[4-(4-aminophenoxy)phenyl]-2-[4-(4-aminophenoxy)-3-methylphenyl]propane, 2,2-bis[4-(4-aminophenoxy)-3-methylphenyl]propane, 2-[4-(4-aminophenoxy)phenyl]-2-[4-(4-aminophenoxy)-3,5-dimethylphenyl]propane, 2,2-bis[4-(4-aminophenoxy)-3,5-dimethylphenyl]propane, 2,2-bis[4-(4-aminophenoxy)phenyl]-1,1,1,3,3,3-hexafluoropropane, 1,3-bis(4-aminophenoxy)benzene, 1,4-bis(3-aminophenoxy)benzene, 1,4-bis(4-aminophenoxy)benzene, 4,4'-bis(4-aminophenoxy)biphenyl, bis[4-(4-aminophenoxy)phenyl] ketone, bis[4-(4-aminophenoxy)phenyl]sulfide, bis[4-(4-aminophenoxy)phenyl]sulfoxide, bis[4-(4-aminophenoxy)phenyl]sulfone, bis[4-(3-aminophenoxy)phenyl]ether, bis[4-(4-aminophenoxy)phenyl]ether, 1,3-bis[4-(3-aminophenoxy)benzoyl]benzene, 1,3-bis[4-(4-aminophenoxy)benzoyl]benzene, 1,4-bis[4-(3-aminophenoxy)benzoyl]benzene, 1,4-bis[4-(4-aminophenoxy)benzoyl]benzene, 4,4'-bis(3-aminophenoxy)biphenyl, 4,4'-bis(3-aminophenoxy)-3,3'-dimethylbiphenyl, 4,4'-bis(3-aminophenoxy)-3,5-dimethylbiphenyl, 4,4'-bis(3-aminophenoxy)-3,3',5,5'-tetramethylbiphenyl, 4,4'-bis(3-aminophenoxy)-3,3'-dichlorobiphenyl, 4,4'-bis(3-aminophenoxy)-3,5-dichlorobiphenyl, 4,4'-bis(3-aminophenoxy)-3,3',5,5'-tetrachlorobiphenyl, 4,4'-bis(3-aminophenoxy)-3,5-dibromobiphenyl, 4,4'-bis(3-aminophenoxy)-3,3',5,5'-tetrabromobiphenyl, bis[4-(3-aminophenoxy)-3-methoxyphenyl]sulfide, 4-(3-aminophenoxy)phenyl][4-(3-aminophenoxy)-3,5-dimethoxyphenyl]sulfide and bis[4-(3-aminophenoxy)-3,5-dimethoxyphenyl]sulfide.

Polyimide prepared by using these aromatic diamines and aromatic tetracarboxylic dianhydrides as monomer components primarily has a requisite structural unit consisting of one or more recurring structural units of the formula (1), the formula (2), that is, the formula (5) or (6), or the formula (3), that is, the formula (7) or (8).

Polyimide also includes a capped polyimide which is terminated at the end of the polymer chain having a requisite structural unit consisting of one or more recurring structural units of the formula (1), (2), (5), (6),(3), (7) or (8) with an aromatic ring which is unsubstituted or substituted with a radical having no reactivity with amine or dicarboxylic anhydride.

Additionally, the said polyimide copolymer also may be terminated at the end of polymer chain with the aromatic ring.

The capped polyimide having at the polymer chain end an aromatic ring which is unsubstituted or substituted with a radical having no reactivity with amine or dicarboxylic anhydride can be prepared by reacting the above diamine with the above tetracarboxylic dianhydride in the presence of aromatic dicarboxylic anhydride of the formula (9):

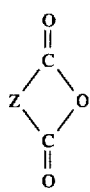 (9)

wherein Z is a divalent radical having 6–15 carbon atoms and being selected from the group consisting of a monoaromatic radical, condensed polyaromatic radical and noncondensed aromatic radical connected to each other with a direct bond or a bridge member, and/or aromatic monoamine represented by the formula (10):

 (10)

wherein V is a monovalent radical having 6–15 carbon atoms and being selected from the group consisting of a monoaromatic radical, condensed polyaromatic radical and noncondensed aromatic radical connected to each other with a direct bond or a bridge member.

Exemplary aromatic dicarboxylic anhydrides of the formula (9) include phthalic anhydride, 2,3-benzophenonedicarboxylic anhydride, 3,4-benzophenonedicarboxylic anhydride, 2,3-dicarboxyphenyl phenyl ether anhydride, 3,4-dicarboxyphenyl phenyl ether anhydride, 2,3-biphenyldicarboxylic anhydride, 3,4-biphenyldicarboxylic anhydride, 2,3-dicarboxyphenyl phenyl sulfone anhydride, 3,4-dicarboxyphenyl phenyl sulfone anhydride, 2,3-dicarboxyphenyl phenyl sulfide anhydride, 3,4-dicarboxyphenyl phenyl sulfide anhydride, 1,2-naphthalenedicarboxylic anhydride, 2,3-naphthalenedicarboxylic anhydride, 1,8-naphthalenedicarboxylic anhydride, 1,2-anthracenedicarboxylic anhydride, 2,3-anthracenedicarboxylic anhydride and 1,9-anthracenedicarboxylic anhydride. These dicarboxylic acid anhydrides can be substituted with a radical having no reactivity with amine and dicarboxylic anhydride and can be used singly or as a mixture.

Phthalic anhydride is most preferred in view of properties and utility of polyimide obtained.

The amount of aromatic dicarboxylic anhydride used is 0.001~1.0 mol per mol of the above diamine. An amount less than 0.001 mol leads to viscosity increase in processing at high temperatures and causes deterioration of processability. On the other hand, an amount exceeding 1.0 mol results in lowered mechanical properties. Preferred amount is in the range of 0.01 to 0.5 mol.

Aromatic monoamines of the formula (10) includes, for example, aniline, o-toluidine, m-toluidine, p-toluidine, 2,3-xylidine, 2,6-xylidine, 3,4-xylidine, 3,5-xylidine, o-chloroaniline, m-chloroaniline, p-chloroaniline, o-bromoaniline, m-bromoaniline, p-bromoaniline, o-nitroaniline, m-nitroaniline, p-nitroaniline, o-aminophenol, m-aminophenol, p-aminophenol, o-anisidine, m-anisidine, p-anisidine, o-phenetidine, m-phenetidine, p-phenetidine, o-aminobenzaldehyde, m-aminobenzaldehyde, p-aminobenzaldehyde, o-aminobenzonitrile, m-aminobenzonitrile, p-aminobenzonitrile, 2-aminobiphenyl, 3-aminobiphenyl, 4-aminobiphenyl, 2-aminophenyl phenyl ether, 3-aminophenyl phenyl ether, 4-aminophenyl phenyl ether, 2-aminobenzophenone, 3-aminobenzophenone, 4-aminobenzophenone, 2-aminophenyl phenyl sulfide, 3-aminophenyl phenyl sulfide, 4-aminophenyl phenyl sulfide, 2-aminophenyl phenyl sulfone, 3-aminophenyl phenyl sulfone, 4-aminophenyl phenyl sulfone, α-naphthylamine, β-naphthylamine, 1-amino-2-naphthol, 2-amino-1-naphthol, 4-amino-1-naphthol, 5-amino-1-naphthol, 5-amino-2-naphthol, 7-amino-2-naphthol, 8-amino-1-naphthol, 8-amino-2-naphthol, 1-aminoanthracene, 2-aminoanthracene, and 9-aminoanthracene. These aromatic monoamines can be substituted with a radical having no reactivity with amine or dicarboxylic anhydride, and can be used singly or as a mixture. Aniline is most preferably used in view of properties and utility of polyimide obtained.

The amount of aromatic monoamine is 0.001~1.0 mol per mol of the aromatic tetracarboxylic dianhydride.

An amount of less than 0.001 mol leads to viscosity increase in processing at high temperatures and causes deterioration of processability.

On the other hand, an amount exceeding 1.0 mol results in lowered mechanical properties. Preferred amount is in the range of 0.01~0.5 mol.

Polyimide of the invention can be prepared by any known process. For example, polyimide of the formula (1) can be prepared by Japanese Laid-Open Patent SHO 61-143478, and polyimide of the formula (3) can be prepared by Japanese Laid-Open Patent SHO 62-50375. Preparation is carried out by the following processes.

(1) A process for preparing polyamic acid in an organic solvent isolating the polyamic acid by removing the solvent at a low temperature under reduced pressure or by pouring the resulting polyamic acid solution into a lean solvent, and imidizing the polyamic acid by heating to obtain polyimide.

(2) A process for preparing a polyamic acid solution by the same procedures as (1), chemically imidizing polyamic acid by addition of a dehydrating agent such as acetic anhydride optionally in the presence of a catalyst, successively isolating resultant polyimide by known procedures and, if desired, washing and drying the polyimide.

(3) A process for preparing polyamic acid solvent by the same procedures as (1) and successively conducting solution removal and thermal imidization at the same time by heating under reduced pressure.

(4) A process for mixing raw materials and solvents, and simultaneously conducting preparation of aromatic polyamic acid and imidization reaction thereof by heating optionally in the presence of a catalyst, azeotropic agent or dehydrating agent.

In the preparation of polyimide by these processes, it is particularly preferred to carry out the reaction in organic solvents.

Organic solvents which can be used include, for example, N,N-dimethylformamide, N,N-dimethylacetamide, N,N-diethylacetamide, N,N-dimethylmethoxyacetamide, N-methyl-2-pyrrolidone, 1,3-dimethyl-2-imidazolidinone, N-methylcaprolactam, 1,2-dimethoxyethane, bis(2-methoxyethyl)ether, 1,2-bis(2-methoxyethoxy)ethane, bis[2-(2-methoxyethoxy)ethyl]ether, tetrahydrofuran, 1,3-dioxane, 1,4-dioxane, pyridine, picoline, dimethyl sulfoxide, dimethyl sulfone, tetramethylurea, hexamethylphosphoramide, phenol, o-cresol, m-cresol, p-cresol, m-cresylic acid, p-chlorophenol, xylenols and anisole. These solvents can be used singly or as a mixture.

When polyimide is prepared in a solvent by using diamines, tetracarboxylic dianhydrides and dicarboxylic anhydride or aromatic monoamine, these raw materials are charged and reacted by the following methods.

(1) A method for reacting tetracarboxylic dianhydride with diamine and successively adding dicarboxylic anhydride or aromatic monoamine to continue the reaction.

(2) A method for reacting diamine with dicarboxylic anhydride and successively adding aromatic tetracarboxylic dianhydride to continue the reaction. Alternatively, a method for reacting tetracarboxylic dianhydride with aromatic monoamine and successively adding diamine to continue the reaction.

(3) A method for simultaneously charging tetracarboxylic dianhydride, diamine and dicarboxylic anhydride or aromatic monoamine to carry out the reaction.

Any of the above methods can be employed for progressing the reaction.

In these methods, the reaction temperature for polymerization and imidization is 300° C. or less. No particular limitation is imposed upon the reaction pressure, and the reaction can be sufficiently carried out under atmospheric pressure.

The reaction time differs depending upon diamine, tetracarboxylic dianhydride, solvent, catalyst and reaction temperature. The reaction time of 4–24 hours is usually sufficient.

In the polyimide, the molar ratio of tetracarboxylic dianhydride to aromatic is usually controlled in order to adjust the molecular weight of the formed polyimide. In oder to obtain polyimide having good melt-flowability in the process of the invention, the molar ratio of diamine to tetracarboxylic dianhydride is suitably in the range of 0.8 to 1.2.

When polyimide copolymer is prepared by reacting a mixture of diamine of the formula (11-a) and diamine of the formula (13) as a diamine component with tetracarboxylic dianhydride of the formula (14) and/or (15), the molar ratio of these diamines is preferably from 0.5 to 0.95 mole of diamine of the formula (11-a), that is, 4,4'-bis(3aminophenoxy)diphenyl, and from 0.5 to 0.05 mole of the formula(13), that is, 1,3-bis(3-aminophenoxy)benzene, for one mole of total amount of diamine component.

The above methods provide polyimide having recurring structural units of the formula (1) for use in the invention, polyimide having recurring structural units of the formula (2), that is, polyimide having recurring structural units of the formula (5) or (6), and polyimide having recurring structural units of the formula (3), that is, polyimide having recurring structural units of the formula (7) or (8), or polyimide copolymer having two or more recurring structural units, or capped polyimide or polyimide copolymer which is terminated the polymer chain end with dicarboxylic anhydride and/or aromatic monoamine.

Polyether pyridine of the formula (4) for use in the invention can be prepared by the process described in Japanese Laid-Open Patent SHO 63-37123.

Polyether pyridine is prepared by reacting 2,6-dihalogenopyridine represented by the formula (17):

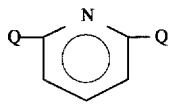  (17)

wherein Q is chlorine atoms, bromine atom or fluorine atom, and may be same or different, with one or more dihydroxy compounds represented by the formula (18):

HO—Y—OH  (18)

wherein Y is a divalent radical represented by

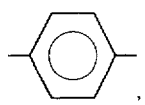

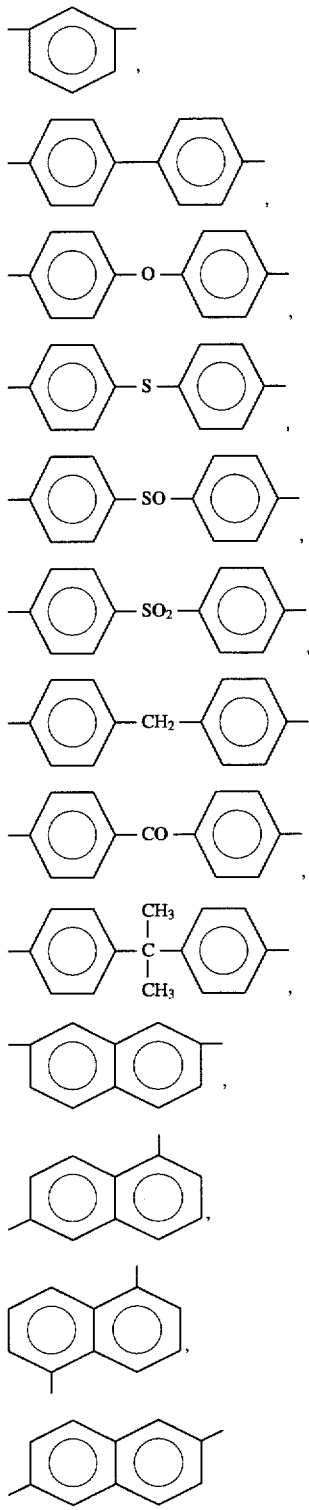

or

-continued

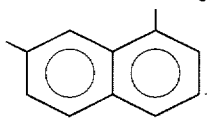

in the presence of alkali metal carbonate and/or bicarbonate or hydroxide. One or more of other dihydroxy compounds can also be used combination in the range of giving no adverse effect on the properties of polyether pyridine.

Polyether pyridine prepared by using 2,6-dihalogenopyridine and the dihydroxy compound as monomer components has recurring structural units of the formula (4). Polyether pyridine also includes a capped polyether pyridine which is terminated at the end of the polymer chain having recurring structural units of the formula (4) with an aromatic ring which is unsubstituted or substituted with a radical having no reactivity with amine and dicarboxylic anhydride.

The favorably melt-processable polyimide resin composition of the present invention is:

(1) a resin composition comprising:
  a. polyimide having a requisite structural unit consisting of one or more recurring structural units of the formula (1) and/or polyimide capped at the polymer chain end thereof, and
  b. polyimide having recurring structural units of the formula (2), specifically the formula (5) or the formula (6), and/or polyimide capped at the polymer chain end thereof (hereinafter referred to as polyimide B), (2) a resin composition comprising:
  a. polyimide having a requisite structural unit consisting of one or more recurring structural units of the formula (1) and/or polyimide capped at the polymer chain end thereof, and
  c. polyimide having recurring structural units of the formula (3), specifically the formula (7) or the formula (8), and/or polyimide capped at the polymer chain end thereof (hereinafter referred to as polyimide C), and (3) a resin composition comprising:
  a. polyimide a requisite structural unit consisting of one or more recurring structural units of the formula (1) and/or polyimide capped at the polymer chain end thereof (hereinafter referred to as polyimide A), and
  d. polyether pyridine having recurring structural units of the formula (4) and/or polyether pyridine capped at the polymer chain end thereof (hereinafter referred to a polyether pyridine D).

The term "and/or" in the above cases means, for example, that "polyimide having recurring structural units of the formula (1) and/or polyimide capped at the polymer chain end thereof" is polyimide having recurring structural units of the formula (1) or polyimide capped at the polymer chain end thereof or a mixture of these polymers.

Polyimide B, polyimide C or polyether pyridine D which is combined with polyimide A as described above can be used as a mixture in the range capable of attaining the effect of the invention. Copolyimide including two or more recurring structural units of the formulae (2) and (3) and end-capped polymer thereof also can be used in the present invention as polyimide B or C.

The polyimide resin composition of the invention is prepared so as to comprise from 99.9 to 50 parts by weight of polyimide A and from 0.1 to 50 parts by weight of polyimide B, polyimide C, polyether pyridine D or a mixture thereof.

The polyimide resin composition of the invention exhibits good melt flowability at a high temperature region of 350° C. or above. The effect on the melt flowability improvement for the polyimide composition of the invention can be observed by addition of only a small amount of polyimide B, polyimide C or polyether pyridine D to polyimide A. The lower limit of addition is 0.1 part by weight, preferably 0.5 part by weight. Various properties of polyether pyridine of the formula (4) rank as one of the excellent in heat resistant resins. However, stability of polyether pyridine against thermal oxidation is inferior to that of polyimide of the formula (1) and thus unfavorably impairs essential characteristics of polyimide of the formula (1). As a result, the proportion of particularly polyether pyridine in the composition has an upper limit and is preferably 50 parts by weight.

The polyimide resin composition of the invention can be prepared from polyimide A and polyimide B, polyimide C, polyether pyridine D or a mixture thereof by a known process. For example, the following processes are preferred.

① Polyimide A is premixed with polyimide B, polyimide C, polyether pyridine D or a mixture thereof by using a mortar, Henschel mixer, drum blender, tumbling mixture, ball mill or ribbon blender.

② Polyimide A is previously dissolved or suspended in an organic solvent. Polyimide B, polyimide C, polyether pyridine D or a mixture thereof is added to the resulting solution or suspension and uniformly dissolved or suspended. Thereafter the organic solvent is removed.

③ Polyimide B, polyimide C, polyether pyridine D or a mixture thereof is dissolved or suspended in an organic solvent solution of polyamic acid precursor of polyimide A. The resulting solution or suspension is successively heat-treated at 100°–400° C. or chemically imidized by using a common imidizing agent. Thereafter the solvent is removed by a known method.

④ Polyimide A is previously dissolved or suspended in an organic solvent. The resulting solution or suspension is mixed with an organic solvent solution of the polyamic acid precursor of polyimide B, polyimide C or a mixture thereof and successively heat-treated at 100°–400° C. or chemically imidized by using a common imidizing agent. Thereafter the solvent is removed by a known method.

⑤ An organic solvent solution of the polyamic acid precursor of polyimide A is mixed with an organic solvent solution of the polyamic acid precursor of polyimide B, polyimide C or a mixture thereof and successively heat-treated at 100°–400° C. or chemically imidized by using a common imidizing agent. Thereafter the solvent is removed by a known method.

The polyimide resin composition thus obtained is applied as intact to various processing methods such as injection molding, compression molding, transfer molding and extrusion forming. It is more preferred to use the composition after melt kneading.

Particularly in blending the above compositions, it is also a simple and effective method to melt-knead powder and powder, pellet and pellet, or powder and pellet.

Melt-kneading can be conducted with equipment commonly used for melt-kneading rubber and plastics, for example, hot rolls, Banbury mixture, Brabender and extruder.

The melt-kneading temperature is set above the melt-flow temperature of the formulation and below the decomposition initiating temperature of the formulation. The temperature is usually 250°–420° C., preferably 300°–400° C.

The melt-processable resin composition of the invention can be preferably processed by injection molding or extrusion forming which provides a uniformly blended product and has high productivity. Other processing methods such as compression molding, transfer molding and sinter forming can also be employed.

Other resins can also be formulated in a suitable amount depending upon the use of product as long as giving no adverse effect on the object of the invention.

Other resins include, for example, thermoplastic resins such as polyethylene, polypropylene, polycarbonate, polyarylate, polyamide, polysulfone, polyether sulfone, polyether ketone, polyphenylene sulfide, polyamideimide, polyetherimide, modified polyphenylene oxide and other kinds of polyimide, and thermosetting resins.

One or more solid lubricants such as molybdenum disulfide, graphite, boron nitride, lead monoxide and lead powder can be added to the polyimide resin composition of the invention.

Further, other common additives such as antioxidants, heat stabilizers, ultraviolet absorbers, flame retardants, flame retarding adjuvants, antistatic agents and colorants can also be added to the composition in the range of not impairing the object of the invention.

One or more reinforcements, for example, glass fiber, carbon fiber, aromatic polyamide fiber, potassium titanate fiber and glass can also be added to the composition.

A polyimide based resin composition of the present invention comprise polyimide resin composition or polyimide copolymer of the present invention and one or more fibrous reinforcements.

The fibrous reinforcements used in the invention include, for example, carbon fiber, glass fiber, aromatic polyamide fiber, potassium titanate fiber and the like. Carbon fiber is preferably used in practical.

Amount of the fibrous reinforcements used in the polyimide based composition is 5 to 100 parts by weight, preferably 10 to 100 parts by weight for 100 parts by weight of the above polyimide resin composition or the polyimide copolymer.

In case of the polyimide copolymer having recurring structural units of the formulas (1) and (2), especially, the polyimide copolymer having 0.5 to 0.95 molar ratio of recurring structural unit of the formula (1) and 0.5 to 0.05 molar ratio of recurring structural unit of the formula (2), the amount of the fibrous reinforcements is preferably 5 to 65 parts by weight, more preferably 15 to 40 parts by weight, most preferably 25 to 35 parts by weight, for 100 parts by weight of the polyimide copolymer.

An amount less than 5 parts by weight causes reduction mechanical strength and can not sufficient repeated fatigue strength. On the other hand, an amount exceeding 65 parts by weight lowers melt-processability.

The polyimide based resin composition of the invention can be prepared by various known processes for blending fibrous reinforcements in resin. For example, the polyimide resin composition or the polyimide copolymer is premixed with the fibrous reinforcement by using a mortar, Henschel mixer, drum blender, tumbling mixer, ball mill or ribbon blender and thereafter melt-kneaded with a melt mixer or hot rolls to obtain pellets or a powdery mixture.

The polyimide based resin composition of the invention can provide various form of articles by changing the mold for injection molding.

Particularly, the polyimide based resin composition is excepted to be employed as parts for automobile, for example, valve-lifter, impeller and the like, wherein dynamic repeated fatigue is strongly desired.

The present invention will hereinafter be illustrated in detail by way of synthetic examples, examples and comparative examples.

In these examples, properties were measured by the following methods.

Inherent viscosity:
   After dissolving 0.50 g of polyimide powder in 100 ml of a solvent mixture of p-chlorophenol and phenol in a weight ratio of 90:10, the solution was cooled to 35° C. and viscosity was measured.

Glass transition temperature (Tg):
   Measured by DSC with a Shimadzu DT-40 series.

5% weight loss temperature:
   Measured by DTA-TG in the air with a Shimadzu DT-40 series, Model 40M.

Melt viscosity:
   Measured at 420° C. with a Koka type flowtester, Model Shimadzu CFT-500 by using an orifice of 0.1 cm in diameter and 1 cm in length under a 100 Kg load.

Synthetic Example 1

To a reaction vessel equipped with a stirrer, reflux condenser, water separator and a nitrogen inlet tube, 3.68 kg (10.0 mols) of 4,4'-bis(3-aminophenoxy)biphenyl, 2.08 kg (9.53 mol) of pyromellitic dianhydride, 138 g (1.5 mols) of γ-picoline and 23.0 kg of m-cresol were charged and heated to 145° C. with stirring in a nitrogen atmosphere while distilling out about 340 g of water. The reaction was further continued at 140°–150° C. for 4 hours.

Thereafter the reaction mixture was cooled to room temperature, poured into 81.2 kg of methyl ethyl ketone, and filtered. The precipitate thus obtained was further washed with methyl ethyl ketone and dried in a nitrogen atmosphere at 50° C. for 24 hours and successively at 200° C. for 6 hours. Polyimide powder obtained was 5.27 kg (98.5% yield). The polyimide powder had an inherent viscosity of 0.49 dl/g, Tg of 249° C. and a 5% weight loss temperature of 545° C.

Synthetic Example 2

Polyimide was prepared by carrying out the same procedures as described in Synthetic Example 1 except that 3.68 kg (10.0 mols) of 4,4'-bis(3-aminophenoxy)biphenyl and 2.08 kg (9.53 mol) of pyromellitic dianhydride were replaced by 4.32 kg (10.0 mols) of bis[4-(3-aminophenoxy)phenyl]sulfone and 2.09 kg (9.6 mols) of pyromellitic dianhydride. Polyimide powder thus obtained was 5.96 kg (98.5% yield). The polyimide powder had an inherent viscosity of 0.49dl/g, Tg of 254° C. and a 5% weight loss temperature of 540° C.

Synthetic Example 3

Polyimide was prepared by carrying out the same procedures as described in Synthetic Example 1 except that 2.08 kg (9.53 mols) of pyromellitic dianhydride was replaced by 2.10 kg (9.65 mols) of pyromellitic dianhydride and 103.6 g (0.7 mol) of phthalic anhydride was further added.

Polyimide powder thus obtained was 3.88 kg (99.0% yield). The polyimide powder had an inherent viscosity of 0.70 dl/g, Tg of 253° C. and a 5% weight loss temperature of 548° C.

Synthetic Example 4

Polyimide was prepared by carrying out the same procedures as described in Synthetic Example 1 except that 3.68 kg (10.0 mols) of 4,4'-bis(3-aminophenoxy)biphenyl and 2.08 kg (9.53 mol) of pyromellitic dianhydride were replaced by 2.92 kg (10.0 mols) of 1,3-bis(3-aminophenoxy)benzene and 1.96 kg(9.00 mols) of pyromellitic dianhydride, and 296 g (2.00 mols) of phthalic anhydride was further added.

Polyimide powder thus obtained was 5.23 kg (95% yield). The polyimide powder had an inherent viscosity of 0.24 dl/g, Tg of 194° C. and a 5% weight loss temperature of 498° C.

Synthetic Example 5

Polyimide was prepared by carrying out the same procedures as described in Synthetic Example 1 except that 3.68 kg (10.0 mols) of 4,4'-bis(3-aminophenoxy)biphenyl and 2.08 kg (9.53 mol) of pyromellitic dianhydride were replaced by 2.92 kg (10.0 mols) of 1,3-bis(3-aminophenoxy)benzene and 2.65 kg (9.00 mols) of 3,3',4,4'-biphenyltetracarboxylic dianhydride, and 296 g (2.00 mols) of phthalic anhydride was further added. Polyimide powder thus obtained was 5.23 kg (95% yield). The polyimide powder had an inherent viscosity of 0.26dl/g, Tg of 183° C. and a 5% weight loss temperature of 502° C.

Synthetic Example 6

Polyimide was prepared by carrying out the same procedures as described in Synthetic Example 1 except that 3.68 kg (10.0 mols) of 4,4'-bis(3-aminophenoxy)biphenyl and 2.08 kg (9.53 mol) of pyromellitic dianhydride were replaced by 4.91 kg (10.0 mols) of 6,6'-bis (3-aminophenoxy)-3,3,3',3'-tetramethyl-1,1'-spirobiindane and 2.12 kg (9.70 mols) of pyromellitic dianhydride, and 88.8 g (0.06 mol) of phthalic anhydride was further added. Polyimide powder thus obtained was 5.41 kg (80% yield), The polyimide powder had an inherent viscosity of 0.31 dl/g, Tg of 243° C. and a 5% weight loss temperature of 504° C.

Synthetic Example 7

Polyimide was prepared by carrying out the same procedures as described in Synthetic Example 1 except that 3.68 kg (10.0 mols) of 4,4'-bis(3-aminophenoxy)biphenyl and 2.08 kg (9.53 mols) of pyromellitic dianhydride were replaced by 3.551 kg (9.65 mols) of 4,4'-bis(3-aminophenoxy)biphenyl and 2.18 kg (10.0 mols) of pyromellitic dianhydride, and 65.1 g (0.7 mol) of aniline was further added. Polyimide powder thus obtained was 5.66 kg. The polyimide powder had an inherent viscosity of 0.70 dl/g, Tg of 252° C., and a 5% weight loss temperature of 547° C.

Synthetic Example 8

Polyimide was prepared by carrying out the same procedures as described in Synthetic Example 3 except that 2.10 kg (9.65 mols) of pyromellitic dianhydride was replaced by 2.84 kg (9.6 mols) of 3,3',4,4'-biphenyltetracarboxylic dianhydride. Polyimide powder thus obtained was 6.2 kg (99% yield). The polyimide powder had an inherent viscosity of 0.76 dl/g, Tg of 221° C., and a 5% weight loss temperature of 536° C.

Synthetic Example 9

Polyimide was prepared by carrying out the same procedures as described in Synthetic Example 3 except that 2.10 kg (9.65 mols) of pyromellitic dianhydride was replaced by 2.99 kg (9.65 mols) of 3,3',4,4'-diphenylethertetracarboxylic dianhydride. Polyimide powder thus obtained was 6.35 kg (99% yield). The polyimide powder had an inherent viscosity of 0.78 dl/g, Tg of 200° C., and a 5% weight loss temperature of 515° C.

Synthetic Example 10

Polyimide was prepared by carrying out the same procedures as described in Synthetic Example 3 except that 2.10 kg (9.65 mols) of pyromellitic dianhydride was replaced by 1.912 kg (9.65 mols) of 1,2,3,4-butanetetracarboxylic dianhydride. Polyimide powder thus obtained was 5.23 kg (98% yield). The polyimide powder had an inherent viscosity of 0.50 dl/g, Tg of 210° C., and a 5% weight loss temperature of 400° C.

Synthetic Example 11

To a 10 liter reaction vessel equipped with a stirrer and water separator, 750 g (5.03 mols) of purified 2,6-dichloropyridine, 931 g (5.0 mols) of purified 4,4'-dihydroxybiphenyl, 760 g (5.5 mols) of anhydrous potassium carbonate, 2000 ml of 1,3-dimethyl-2-imidazolidinone and 2000 ml of benzene were charged. The mixture was heated with stirring under nitrogen gas ventilation and azeotropic dehydration was carried out for an hour under refluxing of benzene. Successively benzene was gradually removed from the reaction system while maintaining the refluxing state. The temperature of the mixture rose from 120° C. to 140° C. over 2 hours.

Successively the reaction was carried out at 170°–180° C. for 3 hours with occasional and dropwise addition of toluene for azeotropic dehydration. The reaction was further continued at 200° C. for 3 hours and at 220° C. for 3 hours.

After finishing the reaction, the reaction mixture which was in a partially crystallized state was directly poured into 4 liters of methanol, stirred for 10 minutes with a high speed mixture and filtered.

The filter cake was washed with 4 liters of a 70% aqueous methanol solution, filtered washed thoroughly with water, and dried. White powder thus obtained was 1.3 kg.

Synthetic Example 12

Procedures of Synthetic Example 11 were repeated except that the raw material 4,4'-dihydroxydiphenyl was replaced by 550 g (5.0 moles) of hydroquinone. White polymer thus obtained was 900 g.

Synthetic Example 13

Polyimide powder was prepared by repeating the procedures of Synthetic Example 1 except that 2.08 kg (9.53 mols) of pyromellitic dianhydride dianhydride was replaced by 2.16 kg (9.9 mols) of pyromellitic dianhydride. Polyimide powder thus obtained had an inherent viscosity of 0.90 dl/g, Tg of 261° C., and a 5% weight loss temperature of 553° C.

Synthetic Example 14

To a reaction vessel equipped with a stirrer, reflux condenser, water separator and a nitrogen inlet tube, 1.84 kg (5.0 mols) of 4,4'-bis(3-aminophenoxy)biphenyl, 1.46 kg (5.0moles) of 1,3-bis(3-aminophenoxy)benzene, 2.15 kg (9.85 mol) of pyromellitic dianhydride, 44.4 g (0.3 mole) of phthalic anhydride, 138 g (1.5 mols) of γ-picoline and 21.8 kg of m-cresol were charged and heated to 145° C. with stirring in a nitrogen atmosphere while distilling out about 340 g of water. The reaction was further continued at 140°–150° C. for 4 hours.

Thereafter the reaction mixture was cooled to room temperature, poured into 80 kg of methyl ethyl ketone, and filtered. The precipitate thus obtained was further washed with methyl ethyl ketone and dried in a nitrogen atmosphere at 50° C. for 24 hours and successively at 200° C. for 6 hours. Polyimide powder obtained was 5.01 kg (98.5% yield). The polyimide powder had an inherent viscosity of 0.79 dl/g, Tg of 235° C. and a 5% weight loss temperature of 550° C.

Synthetic Example 15

Polyimide was prepared by carrying out the same procedures as described in Synthetic Example 14 except that 1.84 kg (5.0 mols) of 4,4'-bis(3-aminophenoxy)biphenyl, 1.46 kg (5.0 mols) of 1,3-bis(3-aminophenoxy)benzene, 2.15 kg (9.85 mol) of pyromellitic dianhydride, 44.4 g (0.3 mole) of phthalic anhydride was replaced by 2.944 kg (8.0 mols) of 4,4'-bis(3-aminophenoxy)biphenyl, 0.584 kg (2.0 mols) of 1,3-bis(3-aminophenoxy)benzene, 2.13 kg (9.75 mols) of pyromellitic dianhydride, 74 g (0.5 mols) of phthalic anhydride. Polyimide powder thus obtained was 5.32 kg (99% yield). The polyimide powder had an inherent viscosity of 0.55 dl/g, Tg of 240° C., and a 5% weight loss temperature of 550° C.

Synthetic Example 16

Polyimide was prepared by carrying out the same procedures as described in Synthetic Example 15 except that 2.944 kg (8.0 mols) of 4,4'-bis(3-aminophenoxy)biphenyl, 0.58 kg (2.0 mols) of 1,3-bis(3-aminophenoxy)benzene was replaced by 3.68 kg (10.0 mols) of 4,4'-bis(3-aminophenoxy)biphenyl. Polyimide powder thus obtained was 5.47 kg (99% yield). The polyimide powder had an inherent the mixture was measured at 420° C. Results are illustrated in Table 1 together with the 5% weight loss temperature of the strand obtained.

Comparative Examples 1–4

The same procedures as described in Examples 1–6 were carried out by using compositions outside the scope of the invention. Results are illustrated in Table 1.

TABLE 1

|  | Polyimide | | Polyimide of | Melt | 5% Weight |
|---|---|---|---|---|---|
|  | Synthetic Example | (wt %) | Synthetic Example 4 (wt %) | Viscosity (poise) | loss temperature (°C.) |
| Comparative Example 1 | 1 | 100 | 0 | 15480 | 545 |
| Example 1 | 1 | 95 | 5 | 6070 | 540 |
| Example 2 | 1 | 90 | 10 | 5090 | 540 |
| Example 3 | 1 | 70 | 30 | 4750 | 533 |
| Example 4 | 1 | 50 | 50 | 3490 | 535 |
| Comparative Example 2 | 1 | 30 | 70 | 2860 | 503 |
| Comparative Example 3 | 2 | 100 | 0 | 3100 | 540 |
| Example 5 | 2 | 90 | 10 | 1580 | 535 |
| Example 6 | 2 | 70 | 30 | 1420 | 531 |
| Comparative Example 4 | 2 | 20 | 80 | 1000 | 502 | viscosity of 0.54dl/g, Tg of 240° C., and a 5% weight loss temperature of 550° C.

Comparative Synthetic Example 1

Polyimide was prepared by carrying out the same procedures as described in Synthetic Example 15 except that 2.944 kg (8.0 mols) of 4,4'-bis(3-aminophenoxy)biphenyl, 0.58 kg (2.0 mols) of 1,3-bis(3-aminophenoxy)benzene was replaced by 2.98 kg (10.0 mols) of 1,3-bis(3-aminophenoxy)benzene. Polyimide powder thus obtained was 4.71 kg (98% yield). The polyimide powder had an inherent viscosity of 0.55dl/g, Tg of 240° C., and a 5% weight loss temperature of 218° C.

Synthetic Example 17

EXAMPLES 7–9

Polyimide powder obtained in Synthetic Example 3 was dry blended with polyimide powder obtained in Synthetic Example 4 for improving melt flowability in various proportions illustrated in Table 2. Melt viscosity of the mixture was measured at 420° C. at 5-minute residence and 30-minute residence. Results are summarized in Table 2.

Comparative Example 5

The same procedures as described in Examples 7–9 were carried out by using compositions outside the scope of the invention. Results are illustrated in Table 2.

TABLE 2

|  | Polyimide | | Polyimide of | Melt viscosity | |
|---|---|---|---|---|---|
|  | Synthetic | | Synthetic | residence at 420° C. | |
|  | Example | (wt %) | Example 4 (wt %) | 5 min. (poise) | 30 min. (poise) |
| Comparative Example 5 | 3 | 100 | 0 | 204700 | 210000 |
| Example 7 | 3 | 90 | 10 | 10500 | 11100 |
| Example 8 | 3 | 70 | 30 | 8200 | 8500 |
| Example 9 | 3 | 50 | 50 | 6900 | 7500 |

Polyimide was prepared by carrying out the same procedures as described in Synthetic Example 14 except that 2.15 kg (9.85 mol) of pyromellitic dianhydride, 44.4 g (0.3 mole) of phthalic anhydride was replaced by 2.21 kg (10.15 mols) of pyromellitic dianhydride, 27.9 g (0.3 mols) of aniline. Polyimide powder thus obtained was 5.35 kg (98.5% yield). The polyimide powder had an inherent viscosity of 0.79 dl/g, Tg of 235° C., and a 5% weight loss temperature of 550° C.

EXAMPLES 1–6

The polyimide powder obtained in Synthetic Example 1 or 2 was dry-blended with the polyimide powder obtained in Synthetic Example 4 for improving melt flowability in various proportions illustrated in Table 1. Melt viscosity of

EXAMPLES 10–15

The polyimide powder obtained in Synthetic Example 1 or 2 was dry-blended with the polyimide powder obtained in Synthetic Example 5 for improving melt flowability in various proportions illustrated in Table 3.

Melt viscosity of the mixture was measured at 420° C. Results are illustrated in Table 3 together with the 5% weight loss temperature of the strand obtained.

Comparative Examples 6–9

The same procedures as described in Examples 10–15 were carried out by using compositions outside the scope of the invention. Results are illustrated in Table 3.

TABLE 3

|  | Polyimide | | Polyimide of | Melt | 5% Weight |
|---|---|---|---|---|---|
|  | Synthetic Example | (wt %) | Synthetic Example 5 (wt %) | Viscosity (poise) | loss temperature (°C.) |
| Comparative Example 6 | 1 | 100 | 0 | 15480 | 545 |
| Example 10 | 1 | 95 | 5 | 6080 | 540 |
| Example 11 | 1 | 90 | 10 | 5160 | 540 |
| Example 12 | 1 | 70 | 30 | 4800 | 538 |
| Example 13 | 1 | 50 | 50 | 3500 | 535 |
| Comparative Example 7 | 1 | 30 | 70 | 2900 | 508 |
| Comparative Example 8 | 2 | 100 | 0 | 3100 | 540 |
| Example 14 | 2 | 90 | 10 | 1600 | 535 |
| Example 15 | 2 | 70 | 30 | 1400 | 531 |
| Comparative Example 9 | 2 | 20 | 80 | 1000 | 510 |

EXAMPLES 16–18

Polyimide powder obtained in Synthetic Example 3 was dry blended with polyimide powder obtained in Synthetic Example 5 for improving melt flowability in various proportions illustrated in Table 4. Melt viscosity of the mixture was measured at 420° C. at 5-minute residence and 30-minute residence. Results are illustrated in Table 4.

Comparative Example 10

The same procedures as described in Examples 16–18 were carried out by using compositions outside the scope of the invention. Results are illustrated in Table 4.

the mixture was measured at 420° C.

Results are illustrated in Table 5 together with the 5% weight loss temperature of the strand obtained.

Comparative Examples 11–14

The same procedures as described in Examples 19–24 were carried out by using compositions outside the scope of the invention. Results are illustrated in Table 5.

TABLE 4

|  | Polyimide | | Polyimide of | Melt viscosity | |
|---|---|---|---|---|---|
|  | Synthetic | | Synthetic | residence at 420° C. | |
|  | Example | (wt %) | Example 5 (wt %) | 5 min. (poise) | 30 min. (poise) |
| Comparative Example 10 | 3 | 100 | 0 | 204700 | 210000 |
| Example 16 | 3 | 90 | 10 | 10300 | 10900 |
| Example 17 | 3 | 70 | 30 | 8100 | 8400 |
| Example 18 | 3 | 50 | 50 | 7000 | 7600 |

EXAMPLES 19–24

The polyimide powder obtained in Synthetic Example 1 or 2 was dry blended with the polyimide powder obtained in Synthetic Example 6 for improving melt flowability in various proportions illustrated in Table 5. Melt viscosity of

TABLE 5

|  | Polyimide | | Polyimide of | Melt | 5% Weight |
|---|---|---|---|---|---|
|  | Synthetic Example | (wt %) | Synthetic Example 6 (wt %) | Viscosity (poise) | loss temperature (°C.) |
| Comparative Example 11 | 1 | 100 | 0 | 15480 | 545 |
| Example 19 | 1 | 95 | 5 | 5080 | 540 |
| Example 20 | 1 | 90 | 10 | 4160 | 540 |
| Example 21 | 1 | 70 | 30 | 3800 | 538 |
| Example 22 | 1 | 50 | 50 | 2500 | 535 |
| Comparative Example 12 | 1 | 30 | 70 | 1900 | 513 |
| Comparative Example 13 | 2 | 100 | 0 | 3100 | 540 |
| Example 23 | 2 | 90 | 10 | 1500 | 535 |
| Example 24 | 2 | 70 | 30 | 1300 | 531 |
| Comparative Example 14 | 2 | 20 | 80 | 1000 | 510 | various proportions illustrated in Table 5. Melt viscosity of

EXAMPLES 25–27

Polyimide powder obtained in Synthetic Example 3 was dry blended with polyimide powder obtained in Synthetic Example 6 for improving melt flowability in various proportions illustrated in Table 6.

Melt viscosity of the mixture was measured at 420° C. at 5-minute residence and 30-minute residence. Results are illustrated in Table 6.

Comparative Example 15

The same procedures as described in Examples 25–27 were carried out by using compositions outside the scope of the invention. Results are illustrated in Table 6.

Melt viscosity of the mixture was measured at 420° C. Results are illustrated in Table 7 together with the 5% weight loss temperature of the strand obtained.

Comparative Example 22

The same procedures as described in Examples 34–35 were carried out by using compositions outside the scope of the invention.

Results are illustrated in Table 8.

TABLE 6

|  | Polyimide | | Polyimide of | Melt viscosity | |
|  | Synthetic | | Synthetic | residence at 420° C. | |
|  | Example | (wt %) | Example 6 (wt %) | 5 min. (poise) | 30 min. (poise) |
| --- | --- | --- | --- | --- | --- |
| Comparative Example 15 | 3 | 100 | 0 | 204700 | 210000 |
| Example 25 | 3 | 90 | 10 | 7300 | 7400 |
| Example 26 | 3 | 70 | 30 | 5100 | 5400 |
| Example 27 | 3 | 50 | 50 | 4000 | 4600 |

EXAMPLES 28–33

The polyimide powder obtained in Synthetic Example 7, 8, or 9 was dry-blended with the polyimide powder obtained in Synthetic Example 6 for improving melt flowability in various proportions illustrated in Table 7.

Melt viscosity of the mixture was measured at 420° C. Results are illustrated in Table 7 together with the 5% weight loss temperature of the strand obtained.

Comparative Examples 16–21

The same procedures as described in Examples 28–33 were carried out by using compositions outside the scope of the invention. Results are illustrated in Table 7.

TABLE 7

|  | Polyimide | | Polyimide of | Melt | 5% Weight |
|  | Synthetic Example | (wt %) | Synthetic Example 6 (wt %) | Viscosity (poise) | loss temperature (°C.) |
| --- | --- | --- | --- | --- | --- |
| Comparative Example 16 | 7 | 100 | 0 | 154800 | 547 |
| Example 28 | 7 | 90 | 10 | 4150 | 540 |
| Example 29 | 7 | 70 | 30 | 3900 | 538 |
| Comparative Example 17 | 7 | 20 | 80 | 1500 | 508 |
| Comparative Example 18 | 8 | 100 | 0 | 42000 | 536 |
| Example 30 | 8 | 90 | 10 | 4500 | 528 |
| Example 31 | 8 | 70 | 30 | 3600 | 525 |
| Comparative Example 19 | 8 | 20 | 80 | 2700 | 503 |
| Comparative Example 20 | 9 | 100 | 0 | 39000 | 515 |
| Example 32 | 9 | 90 | 10 | 5100 | 507 |
| Example 33 | 9 | 70 | 30 | 4600 | 502 |
| Comparative Example 21 | 9 | 20 | 80 | 2900 | 479 |

EXAMPLES 34–35

Polyimide powder obtained in Synthetic Example 10 was dry blended with polyimide powder obtained in Synthetic Example 6 for improving melt flowability in various proportions illustrated in Table 8.

TABLE 8

|  | Polyimide |  | Polyimide of Synthetic Example 6 (wt %) | Melt Viscosity (poise) | 5% Weight loss temperature (°C.) |
|---|---|---|---|---|---|
|  | Synthetic Example | (wt %) |  |  |  |
| Example 34 | 10 | 90 | 10 | 7200 | 440 |
| Example 35 | 10 | 70 | 30 | 5300 | 450 |
| Comparative Example 22 | 10 | 100 | 0 | 36000 | 400 |

EXAMPLES 36–41

The polyimide powder obtained in Synthetic Example 1 or 2 was dry-blended with polyether pyridine powder obtained in Synthetic Example 11 in various proportions illustrated in Table 9. Melt viscosity of the mixture was measured at 420° C.

Results are illustrated in Table 9 together with the 5% weight loss temperature of the strand obtained.

Comparative Examples 23–26

The same procedures as described in Examples 36–41 were carried out by using compositions outside the scope of the invention. Results are illustrated in Table 9.

Melt viscosity of the mixture was measured at 420° C. at 5-minute residence and 30-minute residence. Results are illustrated in Table 10.

Comparative Examples 27–28

The same procedures as described in Examples 42–44 were carried out by using compositions outside the scope of the invention. Results are illustrated in Table 10.

TABLE 9

|  | Polyimide |  | Polyether pyridine of Synthetic Example 11 (wt %) | Melt Viscosity (poise) | 5% Weight loss temperature (°C.) |
|---|---|---|---|---|---|
|  | Synthetic Example | (wt %) |  |  |  |
| Comparative Example 23 | 1 | 100 | 0 | 154800 | 545 |
| Example 36 | 1 | 95 | 5 | 5280 | 500 |
| Example 37 | 1 | 90 | 10 | 4360 | 500 |
| Example 38 | 1 | 70 | 30 | 4100 | 498 |
| Example 39 | 1 | 50 | 50 | 2700 | 495 |
| Comparative Example 24 | 1 | 30 | 70 | 2100 | 463 |
| Comparative Example 25 | 2 | 100 | 0 | 3100 | 540 |
| Example 40 | 2 | 90 | 10 | 1700 | 495 |
| Example 41 | 2 | 70 | 30 | 1500 | 491 |
| Comparative Example 26 | 2 | 20 | 80 | 1200 | 470 |

EXAMPLES 42–44

Polyimide powder obtained in Synthetic Example 3 was dry blended with polyether pyridine powder obtained in Synthetic Example 12 in various proportions illustrated in Table 10.

TABLE 10

|  | Polyimide |  | Polyether pyridine of Synthetic Example 12 (wt %) | Melt viscosity residence at 420° C. | |
|---|---|---|---|---|---|
|  | Synthetic Example | (wt %) |  | 5 min. (poise) | 30 min. (poise) |
| Comparative Example 27 | 3 | 100 | 0 | 204700 | 210000 |
| Example 42 | 3 | 90 | 10 | 7400 | 8400 |
| Example 43 | 3 | 70 | 30 | 5300 | 6400 |
| Example 44 | 3 | 50 | 50 | 4200 | 5600 |
| Comparative Example 28 | 3 | 30 | 70 | 3300 | 4700 |

EXAMPLES 45–54

The polyimide powder obtained in Synthetic Example 7, 8, 9 or 10 was dry-blended with polyether pyridine powder obtained in Synthetic Example 11 in various proportions illustrated in Table 11.

Melt viscosity of the mixture was measured at 420° C.

Results are illustrated in Table 11 together with the 5% weight loss temperature of the strand obtained.

Comparative Examples 29–35

The same procedures as described in Examples 45–54 were carried out by using compositions outside the scope of the invention. Results are illustrated in Table 11.

molding machine at the injection pressure of 500 kg/cm$^2$, cylinder temperature of 410° C. and mold temperature of 180° C. to obtain tensile specimens. The number of repeating times to fatigue was measured by using these specimens in accordance with JIS K-7118.

Results are illustrated in Table 12.

Comparative Example 36

Only the polyimide powder obtained in Synthetic Example 1 was blended with carbon fiber by the same procedures as carried out in Examples 55–59 and similarly injection molded to obtain test specimens. The number of repeating times to fatigue was measured. Results are illus-

TABLE 11

|  | Polyimide | | Polyether pyridine of Synthetic Example 11 (wt %) | Melt Viscosity (poise) | 5% Weight loss temperature (°C.) |
| --- | --- | --- | --- | --- | --- |
|  | Synthetic Example | (wt %) |  |  |  |
| Comparative Example 29 | 7 | 100 | 0 | 204700 | 547 |
| Example 45 | 7 | 95 | 5 | 8950 | 500 |
| Example 46 | 7 | 90 | 10 | 7400 | 500 |
| Example 47 | 7 | 70 | 30 | 5300 | 498 |
| Example 48 | 7 | 50 | 50 | 4200 | 495 |
| Comparative Example 30 | 7 | 30 | 70 | 3300 | 463 |
| Comparative Example 31 | 8 | 100 | 0 | 32000 | 536 |
| Example 49 | 8 | 90 | 10 | 6400 | 495 |
| Example 50 | 8 | 70 | 30 | 3200 | 487 |
| Comparative Example 32 | 8 | 20 | 80 | 2300 | 469 |
| Comparative Example 33 | 9 | 100 | 0 | 39000 | 515 |
| Example 51 | 9 | 90 | 10 | 7000 | 510 |
| Example 52 | 9 | 70 | 30 | 5100 | 508 |
| Comparative Example 34 | 9 | 20 | 80 | 3300 | 475 |
| Example 53 | 10 | 90 | 10 | 8000 | 420 |
| Example 54 | 10 | 70 | 30 | 5600 | 430 |
| Comparative Example 35 | 10 | 100 | 0 | 36900 | 400 |

EXAMPLES 55–59

Polyimide powder obtained in Synthetic Example 4.5 or 6, or polyether pyridine powder obtained in Synthetic Example 11 or 12 was dry blended with polyimide powder obtained in Synthetic Example 1 or 3 in various proportions illustrated in Table 12. To 70 parts by weight of the resulting mixture, 30 parts by weight of carbon fiber HTA-C6 (manufactured by TOHO RAYON CO.) were added, mixed with a drum blender (manufactured by KAWATA SEISAKUSHO Co.) and successively melt-kneaded at 400° C. with a single screw extruder having a diameter of 30 mm. The delivered strand was air cooled and cut into pellets. The pellets thus obtained were injection molded with an Arburg injection trated in Table 12.

These specimens had a low repeating number to fatigue of $1.5 \times 10^5$ times at the maximum vibrational stress of 12 kg/mm$^2$.

Comparative Example 37

Only the polyimide powder obtained in Synthetic Example 3 was blended with carbon fiber by the same procedures as carried out in Examples 55–59 and injection molding was similarly tried. However, injection molded specimen could not be obtained because melt viscosity was too high.

TABLE 12

|  | Polyimide resin composition | | | | | Fatigue property | |
| --- | --- | --- | --- | --- | --- | --- | --- |
|  | Polyimide | | Polyimide or polyether pyridine | | Carbon fiber (wt %) | Maximum vibrational stress (kg/mm$^2$) | Repeating number (times) |
|  | Synthetic Example | (wt %) | Synthetic Example | (wt %) |  |  |  |
| Example 55 | 3 | 63 | 4 | 7 | 30 | 12 | $105 \times 10^5$ |
| Example 56 | 3 | 63 | 5 | 7 | 30 | 12 | $120 \times 10^5$ |
| Example 57 | 3 | 63 | 6 | 7 | 30 | 12 | $125 \times 10^5$ |
| Example 58 | 3 | 63 | 11*[1] | 7 | 30 | 12 | $110 \times 10^5$ |
| Example 59 | 3 | 63 | 12*[1] | 7 | 30 | 12 | $130 \times 10^5$ |
| Comparative | 1 | 70 | — | — | 30 | 12 | $1.5 \times 10^5$ |

TABLE 12-continued

| | Polyimide resin composition | | | | Fatigue property | |
|---|---|---|---|---|---|---|
| | Polyimide | | Polyimide or polyether pyridine | | Carbon | Maximum vibrational | Repeating |
| | Synthetic Example | (wt %) | Synthetic Example | (wt %) | fiber (wt %) | stress (kg/mm$^2$) | number (times) |
| Example 36 Comparative Example 37 | 3 | 70 | — | — | 30 | Injection molding was impossible | |

Note: *[1] Polyether pyridine

EXAMPLES 60–64

Polyimide powder obtained in Synthetic Example 4, 5 or 6, or polyether pyridine powder obtained in Synthetic Example 11 or 12 was dry blended with polyimide powder obtained in Synthetic Example 13 in proportions illustrated in Table 13. The mixture was melt-kneaded at 400° C. with a single screw extruder having a diameter of 30 mm.

Comparative Example 39

Polyimide powder obtained in Synthetic Example 13 was tried to carry out injection molding by the same procedures as described in Examples 60–64. However, injection molding was impossible and specimens could not be obtained.

TABLE 13

| | Polyimide resin composition | | | | Property of molded product*[1] | | | | | |
|---|---|---|---|---|---|---|---|---|---|---|
| | Polyimide Synthetic Example | (wt %) | Polyimide or polyether pyridine Synthetic Example | (wt %) | TS | EL | FS | FM | IZO | HDT |
| Example 60 | 13 | 90 | 4 | 10 | 1040 | 90 | 1530 | 33000 | 9 | 244 |
| Example 61 | 13 | 90 | 5 | 10 | 1080 | 100 | 1530 | 34000 | 11 | 245 |
| Example 62 | 13 | 90 | 6 | 10 | 1200 | 95 | 1590 | 35000 | 12 | 248 |
| Example 63 | 13 | 90 | 11*[2] | 10 | 1030 | 85 | 1540 | 33000 | 9 | 235 |
| Example 64 | 13 | 90 | 12*[2] | 10 | 1000 | 90 | 1500 | 34000 | 10 | 236 |
| Comparative Example 38 | 1 | 100 | — | — | 940 | 90 | 1400 | 30000 | 9 | 238 |
| Comparative Example 39 | 13 | 100 | — | — | Injection molding was impossible | | | | | |

Note: *[1]
| Abbreviation | Property | (Unit) | Test method |
|---|---|---|---|
| TS | tensile strength | (kg/cm$^2$) | ASTM D-638 |
| EL | elongation | (%) | ASTM D-638 |
| FS | flexural strength | (kg/cm$^2$) | ASTM D-790 |
| FM | flexural modulus | (kg/cm$^2$) | ASTM D-790 |
| IZO | Izod impact strength (notched) | (kg · cm/cm) | ASTM D-256 |
| HDT | heat distortion temperature | (°C.) | ASTM D-648 |

*[2] Polyether pyridine

The delivered strand was air cooled and cut into pellets. The pellets thus obtained was injection molded at the injection pressure of 500 kg/cm$^2$, cylinder temperature of 410° C. and mold temperature of 180° C. to obtain various test specimens.

Tensile strength elongation at break, flexural strength, flexural modulus, Izod impact strength and heat distortion temperature were measured by using these specimens.

Comparative Example 38

Polyimide powder obtained in Synthetic Example 1 was injection molded by carrying out the same procedures as described in Examples 60–64. Various mechanical properties were measured by using specimens thus obtained. Results are shown in Table 13.

EXAMPLES 65–67

To 70 parts by weight of Polyimide powder obtained in Synthetic Example 14, 30 parts by weight of carbon fiber HTA-C6 (manufactured by TOHO RAYAON CO.) were added, mixed with a drum blender (manufactured by KAWATA SEISAKUSHO Co.) and successively melt-kneaded at 400° C. with a single screw extruder having a diameter of 30 mm. The delivered strand was air cooled and cut into pellets. The pellets thus obtained were injection molded with an Arburg injection molding machine at the injection pressure of 500 kg/cm$^2$, cylinder temperature of 410° C. and mold temperature of 180° C. to obtain tensile specimens. The number of repeating times to fatigue was measured by using these specimens in accordance with JIS K-7118. Results are illustrated in Table 14.

EXAMPLES 68–70

Only the polyimide powder obtained in Synthetic Example 15 was blended with carbon fiber by the same procedures as carried out in Examples 65–67 and similarly injection molded to obtain test specimens. The number of repeating times to fatigue was measured. Results are illustrated in Table 14.

Comparative Examples 40–42

Only the polyimide powder obtained in Synthetic Example 16 was blended with carbon fiber by the same procedures as carried out in Examples 65–67 and similarly injection molded to obtain test specimens. The number of repeating times to fatigue was measured. Results are illustrated in Table 14.

EXAMPLES 71–73

Only the polyimide powder obtained in Synthetic Example 17 was blended with carbon fiber by the same procedures as carried out in Examples 65–67 and similarly injection molded to obtain test specimens. The number of repeating times to fatigue was measured. Results are illustrated in Table 14.

TABLE 14

| | | Fatigue property | |
|---|---|---|---|
| | Polyimide Synthetic Example No | Maximum vibrational stress (kg/mm$^2$) | Repeating ing number (times) |
| Example 65 | 14 | 13 | $10.0 \times 10^5$ |
| Example 66 | 14 | 12 | $111.0 \times 10^5$ |
| Example 67 | 14 | 11 | $3200.0 \times 10^5$ |
| Example 68 | 15 | 12 | $2.8 \times 10^5$ |
| Example 69 | 15 | 11 | $20.0 \times 10^5$ |
| Example 70 | 15 | 10 | $210.0 \times 10^5$ |
| Comparative Example 40 | 16 | 12 | $1.5 \times 10^5$ |
| Comparative Example 41 | 16 | 11 | $6.0 \times 10^5$ |
| Comparative Example 42 | 16 | 10 | $45.0 \times 10^5$ |
| Example 71 | 17 | 13 | $10.0 \times 10^5$ |
| Example 72 | 17 | 12 | $110.0 \times 10^5$ |
| Example 73 | 17 | 11 | $3200.0 \times 10^5$ |

Note: *1 Polyether pyridine

What is claimed is:

1. A polyimide resin composition substantially comprising 99.9–50 parts by weight of polyimide comprising a requisite structural unit consisting of one or more recurring structural units of the formula (1):

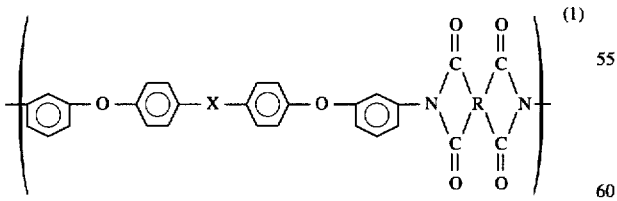

(1)

wherein X is a radical selected from the group consisting of a direct bond, isopropylidene, hexafluoroisopropylidene, carbonyl, thio and sulfonyl, and R is a tetravalent radical having 2–27 carbon atoms and being selected from the group consisting of an aliphatic radical, alicyclic radical, monoaromatic radical, condensed polyaromatic radical and noncondensed aromatic radical connected to each other with a direct bond or a bridge member, and 0.1–50 parts by weight of polyimide comprising a requisite structural unit consisting of one or more recurring structural units of the formula (2):

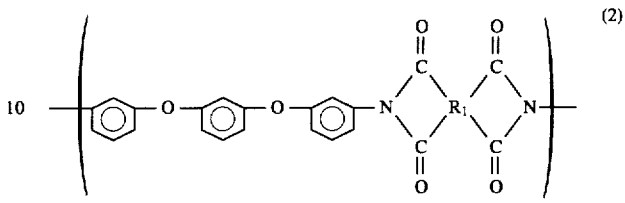

(2)

wherein $R_1$ is a tetravalent radical represented by

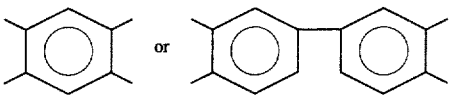

polyimide comprising a requisite structural unit consisting of one or more recurring structural units the formula (3):

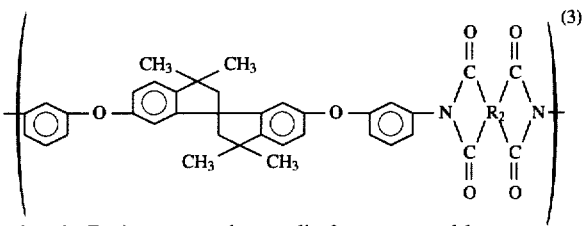

(3)

wherein $R_2$ is a tetravalent radical represented by

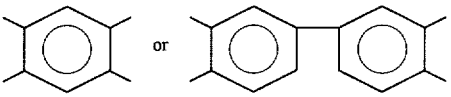

and/or polyether pyridine comprising a requisite structural unit consisting of one or more recurring structural units of the formula (4):

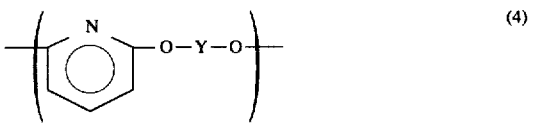

(4)

wherein Y is a divalent radical represented by

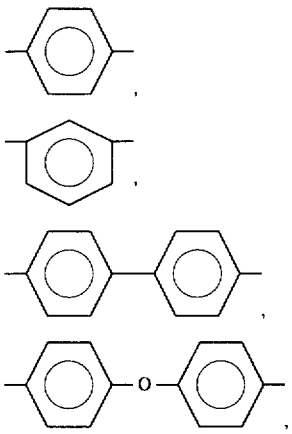

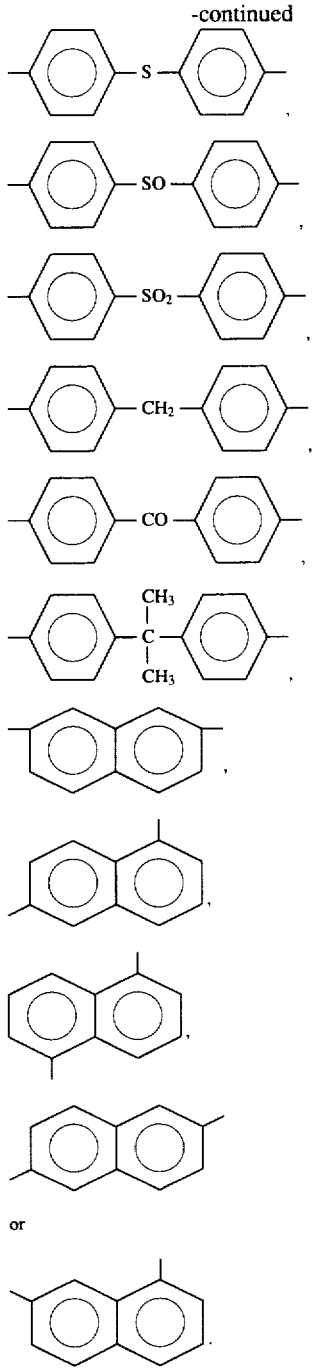

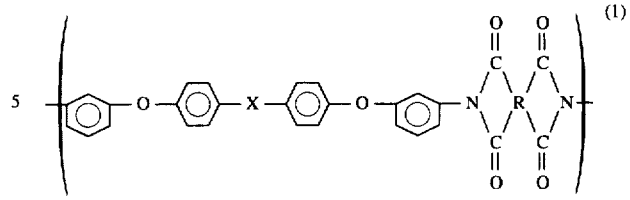

wherein X is a radical selected from the group consisting of a direct bond, isopropylidene, hexafluoroisopropylidene, carbonyl, thio and sulfonyl, and R is a tetravalent radical having 2~27 carbon atoms and being selected from the group consisting of an aliphatic radical, alicyclic radical, monoaromatic radical, condensed polyaromatic radical and noncondensed aromatic radical connected to each other with a direct bond or a bridge member, and 0.1~50 parts by weight of polyimide having recurring structural units of the formula (5):

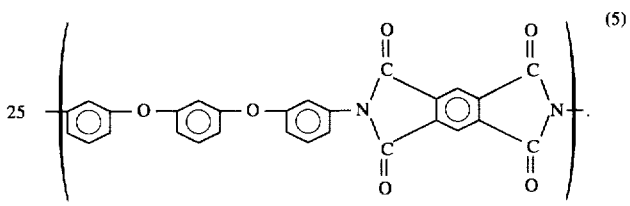

3. A polyimide resin composition substantially comprising 99.9~50 parts by weight of polyimide comprising a requisite structural unit consisting of one or more recurring structural units of the formula (1):

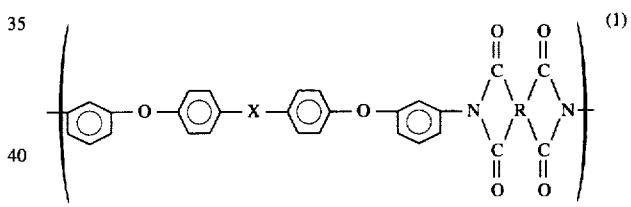

wherein X is a radical selected from the group consisting of a direct bond, isopropylidene, hexafluoroisopropylidene, carbonyl, thio and sulfonyl, and R is a tetravalent radical having 2~27 carbon atoms and being selected from the group consisting of an alkyl radical, alicyclic radical, monoaromatic radical, condensed polyaromatic radical and noncondensed aromatic radical connected to each other with a direct bond or a bridge member, and 0.1~50 parts by weight of polyimide having recurring structural units of the formula (6):

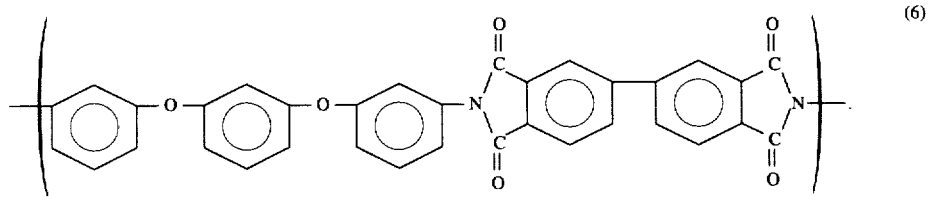

2. A polyimide resin composition substantially comprising 99.9~50 parts by weight of polyimide comprising a requisite structural unit consisting of one or more recurring structural units of the formula (1):

4. A polyimide resin composition substantially comprising 99.9~50 parts by weight of polyimide comprising a requisite structural unit consisting of one or more recurring structural units of the formula (1):

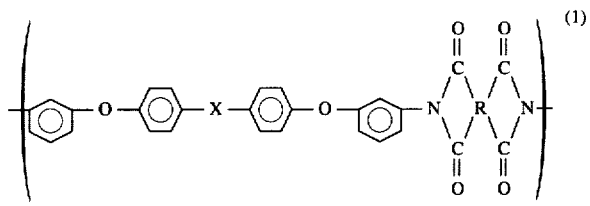

wherein X is a radical selected from the group consisting of a direct bond, isopropylidene, hexafluoroisopropylidene, carbonyl, thio and sulfonyl, and R is a tetravalent radical having 24~27 carbon atoms and being selected from the group consisting of an alkyl radical, alicyclic radical, monoaromatic radical, condensed polyaromatic radical and noncondensed aromatic radical connected to each other with a direct bond or a bridge member, and 0.1~50 parts by weight of polyimide having recurring structural units of the formula (7)

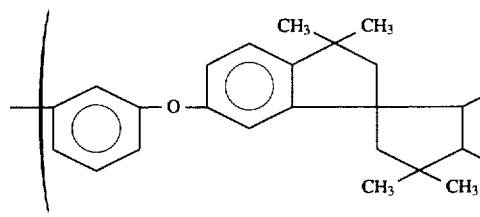

5. A polyimide resin composition substantially comprising 99.9~50 parts by weight of polyimide comprising a requisite structural unit consisting of one or more recurring structural units of the formula (1):

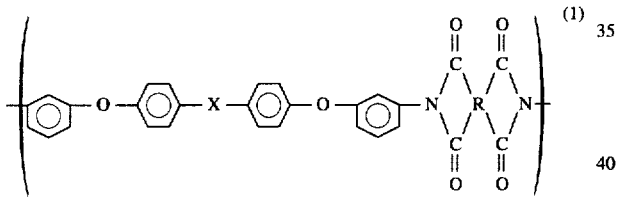

wherein X is a radical selected from the group consisting of a direct bond, isopropylidene, hexafluoroisopropylidene, carbonyl, thio and sulfonyl, and R is a tetravalent radical having 2~27 carbon atoms and being selected from the group consisting of an alkyl radical, alicyclic radical, monoaromatic radical, condensed polyaromatic radical and noncondensed aromatic radical connected to each other with a direct bond or a bridge member, and 0.1~50 parts by weight of polyimide having recurring structural units of the formula (8)

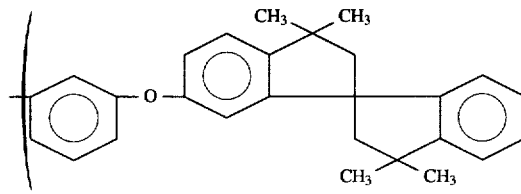

6. A polyimide resin composition substantially comprising 99.9~50 parts by weight of polyimide comprising a requisite structural unit consisting of one or more recurring structural units of the formula (1):

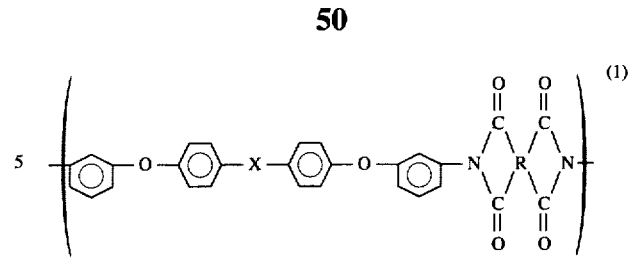

wherein X is a radical selected from the group consisting of a direct bond, isopropylidene, hexafluoroisopropylidene, carbonyl, thio and sulfonyl, and R is a tetravalent radical having 2~27 carbon atoms and being selected from the group consisting of an alkyl radical, alicyclic radical, monoaromatic radical, condensed polyaromatic radical and noncondensed aromatic radical connected to each other with a direct bond or a bridge member, and 0.1~50 parts by weight of polyether pyridine comprising a requisite structural unit consisting of one or more recurring structural units of the formula (4)

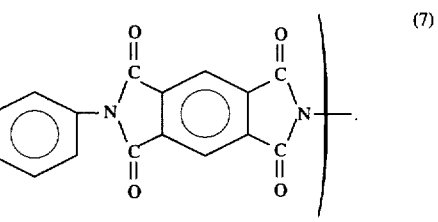

wherein Y is a divalent radical represented by

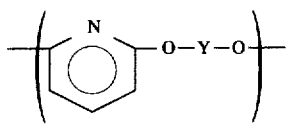

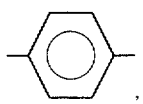

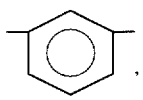

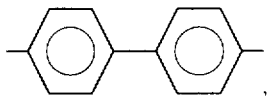

-continued

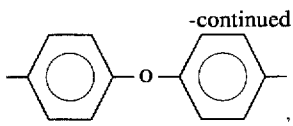

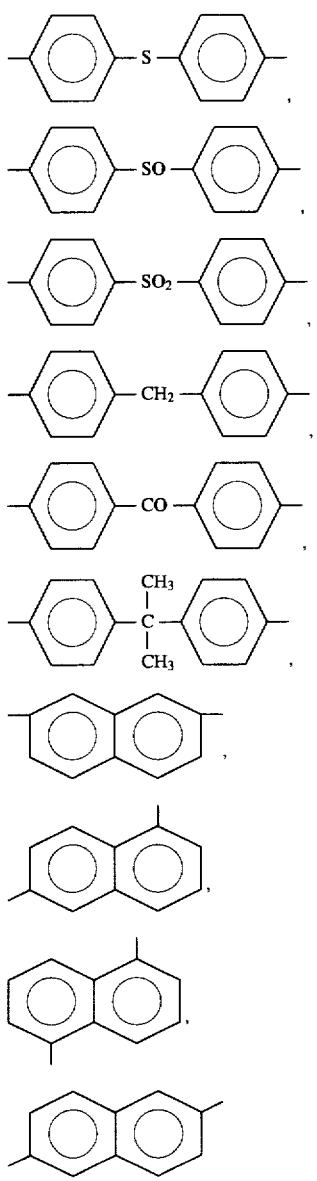

or

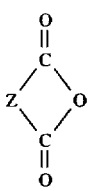

7. A polyimide resin composition of claim 1, 2, 3, 4, or 5 wherein the polyimide having recurring structural units of the formula (1), (2), (3), (5), (6), (7) or (8) comprises an end-capped polymer obtained by preparing said polyimide in the presence of aromatic dicarboxylic anhydride represented by the formula (9):

wherein Z is a divalent radical having 6–15 carbon atoms and being selected from the group consisting of a monoaromatic radical, condensed polyaromatic radical and noncondensed aromatic radical connected to each other with a direct bond or a bridge member, and/or aromatic monoamine represented by the formula (10):

$$V-NH_2 \quad (10)$$

wherein V is a monovalent radical having 6–15 carbon atoms and being selected from the group consisting of a monoaromatic radical, condensed polyaromatic radical and noncondensed aromatic radical connected to each other with a direct bond or a bridge member.

8. A polyimide copolymer obtainable by reacting 0.5 to 0.95 mole of diamine represented by the formula (11)

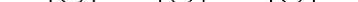

and 0.5 to 0.05 mole of diamine represented by the formula (13):

with tetracarboxylic dianhydride represented by the formula (12):

$$\text{(12)}$$

wherein R is a tetravalent radical having 2–27 carbon atoms and being selected from the group consisting of an alkyl radical, alicyclic radical, monoaromatic radical, condensed polyaromatic radical and noncondensed aromatic radical connected to each other with a direct bond or a bridge member.

9. A polyimide copolymer of claim 8 wherein the diamine of the formula (11) is 4,4-bis(3-aminophenoxy)biphenyl and the tetracarboxylic dianhydride of the formula (12) is pyromellitic dianhydride and/or biphenyltetracarboxylic dianhydride.

10. A polyimide copolymer of claim 8 or 9 wherein the polyimide copolymer comprises an end-capped polymer obtained by preparing said polyimide in the presence of aromatic dicarboxylic anhydride represented by the formula (9):

$$\text{(9)}$$

wherein Z is a divalent radical having 6–15 carbon atoms and being selected from the group consisting of a monoaromatic radical, condensed polyaromatic radical and noncondensed aromatic radical connected to each other with a direct bond or a bridge member, and/or aromatic monoamine represented by the formula (10):

$$V-NH_2 \qquad (10)$$

wherein V is a monovalent radical having 6–15 carbon atoms and being selected from the group consisting of a monoaromatic radical, condensed polyaromatic radical and noncondensed aromatic radical connected to each other with a direct bond or a bridge member.

11. A polymide based resin composition comprising 100 parts by weight of the polymide resin composition of any of claims 1–6 and 5 to 65 parts by weight of a fibrous reinforcement.

12. A polyimide based resin composition of claim 11 wherein the fibrous reinforcement is carbon fiber, glass fiber, aromatic polyamide fiber or potassium titanate fiber.

13. A polyimide based resin composition comprising 100 parts by weight of the polyimide resin composition of claim 7 and 5 to 65 parts by weight of a fibrous reinforcement.

14. A polyimide based resin composition of claim 13 wherein the fibrous reinforcement is carbon fiber, glass fiber, aromatic polyamide fiber or potassium titanate fiber.

15. A polyimide based resin composition comprising 100 parts by weight of the polyimide resin composition of claim 10 and 5 to 65 parts by weight of a fibrous reinforcement.

16. A polyimide based resin composition of claim 15 wherein the fibrous reinforcement is carbon fiber, glass fiber, aromatic polyamide fiber or potassium titanate fiber.

17. A polyimide based resin composition comprising 100 parts by weight of the polyimide resin composition of claims 8 or 9 and 5 to 65 parts by weight of a fibrous reinforcement.

18. A polyimide based resin composition of claim 17 wherein the fibrous reinforcement is carbon fiber, glass fiber aromatic polyamide fiber or potassium titanate fiber.

* * * * *

UNITED STATES PATENT AND TRADEMARK OFFICE
CERTIFICATE OF CORRECTION

PATENT NO.  : 5,494,996

DATED:      : February 27, 1996

INVENTOR(S) : Tamai et al

It is certified that error appears in the above-identified patent and that said Letters Patent is hereby corrected as shown below:

In claim 4, Col. 49, line 12, delete "24~27" and insert therefor --2~27-- as set forth in the original application.

Signed and Sealed this

Tenth Day of December, 1996

Attest:

BRUCE LEHMAN

Attesting Officer     Commissioner of Patents and Trademarks